(12) United States Patent
Giannelia

(10) Patent No.: US 12,497,566 B2
(45) Date of Patent: Dec. 16, 2025

(54) SOLID FORMATIONS OF NON-VOLATILE BITUMINOUS MATERIALS SUITABLE FOR REDUCING CARBON DIOXIDE EMISSIONS DURING TRANSPORT

(71) Applicant: PHILERGOS GROUP FOUNDATION, Cochrane (CA)

(72) Inventor: Vassili Paul Giannelia, Cochrane (CA)

(73) Assignee: PHILERGOS GROUP FOUNDATION, Cochrane (CA)

( * ) Notice: Subject to any disclaimer, the term of this patent is extended or adjusted under 35 U.S.C. 154(b) by 717 days.

(21) Appl. No.: 17/665,520

(22) Filed: Feb. 5, 2022

(65) Prior Publication Data

US 2022/0251388 A1  Aug. 11, 2022

Related U.S. Application Data

(60) Provisional application No. 63/146,812, filed on Feb. 8, 2021.

(51) Int. Cl.
*C08L 95/00* (2006.01)
*C10C 3/00* (2006.01)
(Continued)

(52) U.S. Cl.
CPC .............. *C10C 3/14* (2013.01); *C08L 95/00* (2013.01); *C10C 3/002* (2013.01); *C10C 3/18* (2013.01);
(Continued)

(58) Field of Classification Search
CPC ..................................................... C08L 95/00
See application file for complete search history.

(56) References Cited

U.S. PATENT DOCUMENTS 3,366,233 A * 1/1968 Roediger .............. B65D 75/26
206/524.2
7,820,743 B2  10/2010 Thomas
(Continued)

FOREIGN PATENT DOCUMENTS

CA  2889613       10/2016
CA  2958443 A1    4/2017
(Continued)

OTHER PUBLICATIONS

"Balls of bitumen: Calgary breakthrough could bypass pipeline problem, researcher says" CBC News John Gibson Sep. 6, 2017. https://www.cbc.ca/news/canada/calgary/bitumen-balls-pellets-pipelines-rail-train-transport-energy-alberta-technology-1.4277320 (Year: 2017).*

(Continued)

*Primary Examiner* — Alexandra M Moore
(74) *Attorney, Agent, or Firm* — Whitley Legal Group, P.C.; AnnMarie W Whitley

(57) ABSTRACT

A substantially solid brick of non-volatile bituminous material has a shape that is defined by an irregular outer surface to minimize surface contact with nearby bricks when shipped in bulk. The overall shape is preferably that of a modified tetrahedron having three non-planar face surfaces, a top surface, and a surface or point. Both the top and bottom surfaces are preferably modified domed shapes comprised of several sections. The face sections are preferably modified concave surfaces comprised of several triangular sections that can be planar, concave, or convex. Curved edges connect the face sections to each other and can include several planar edge sections. The bituminous material can include additives, and the brick can further include a skeleton distributed throughout. The skeleton can be a customizable matrix, framework of fiber groups, or other structure (Continued)

and can include customizable buoyant features such as air pockets or capsules.

29 Claims, 20 Drawing Sheets

(51) Int. Cl.

| | |
|---|---|
| *C10C 3/14* | (2006.01) |
| *C10C 3/18* | (2006.01) |
| *C10G 1/00* | (2006.01) |
| *C10L 5/06* | (2006.01) |
| *C10L 5/14* | (2006.01) |
| *C10L 5/36* | (2006.01) |
| *F24H 1/08* | (2022.01) |
| *H05B 3/64* | (2006.01) |

(52) U.S. Cl.
CPC .................. *C10G 1/00* (2013.01); *C10L 5/06* (2013.01); *C10L 5/14* (2013.01); *C10L 5/36* (2013.01); *C08L 2201/08* (2013.01); *C08L 2555/32* (2013.01); *C08L 2555/80* (2013.01); *F24H 1/08* (2013.01); *H05B 3/64* (2013.01); *H05B 2203/013* (2013.01); *H05B 2214/03* (2013.01)

(56) References Cited

U.S. PATENT DOCUMENTS

| | | | |
|---|---|---|---|
| 8,114,494 B2 | 2/2012 | Marchal | |
| 10,093,861 B2 | 10/2018 | Auld et al. | |
| 10,125,321 B2 | 11/2018 | Auld et al. | |
| 10,738,245 B2 | 8/2020 | Auld et al. | |
| 11,214,740 B2 | 1/2022 | Gates et al. | |
| 2005/0123362 A1 | 6/2005 | Price et al. | |
| 2007/0012680 A1 | 1/2007 | Grisoni | |
| 2007/0027235 A1 | 2/2007 | Marchal | |
| 2008/0038474 A1* | 2/2008 | Knight | D06M 15/693 427/407.1 |
| 2011/0147261 A1 | 6/2011 | Marchal | |
| 2011/0290695 A1 | 12/2011 | Thomas | |
| 2014/0041340 A1* | 2/2014 | Thomas | B65B 11/50 53/127 |
| 2015/0166897 A1* | 6/2015 | Kleinhans | C10C 3/14 425/515 |
| 2017/0114281 A1* | 4/2017 | Gupta | B01J 2/006 |
| 2017/0218177 A1 | 8/2017 | Vincent et al. | |
| 2018/0072956 A1 | 3/2018 | Broder | |
| 2019/0241743 A1 | 8/2019 | Gauthier et al. | |
| 2019/0330472 A1* | 10/2019 | Mouazen | C08L 95/00 |
| 2020/0407645 A1 | 12/2020 | Gates et al. | |
| 2021/0017452 A1 | 1/2021 | Auld et al. | |
| 2021/0139785 A1 | 5/2021 | Gates et al. | |

FOREIGN PATENT DOCUMENTS

| | | | |
|---|---|---|---|
| CA | 3008103 A1 | 1/2019 | |
| CA | 3011407 A1 | 1/2020 | |
| CN | 211256564 | 8/2020 | |
| GB | 1116493 A | 6/1968 | |
| WO | 2004096917 A1 | 11/2004 | |
| WO | 2009153324 | 12/2009 | |
| WO | 2017152269 A1 | 9/2017 | |
| WO | WO-2019165542 A1 * | 9/2019 | ........... B29C 43/222 |

OTHER PUBLICATIONS

"Bitumen—A History" Zayn Bilkadi Aramco World Magazine Nov./Dec. 1984 vol. 35 No. 6 https://archive.aramcoworld.com/issue/198406/bitumen.-.a.history.htm (Year: 1984).*

Abstract and First Page Preview Arie Nissenbaum; Dead Sea AsphaltsäHistorical Aspects. AAPG Bulletin 1978; 62 (5): 837-844. doi: https://doi.org/10.1306/C1EA4E5F-16C9-11D7-8645000102C1865D (Year: 1978).*

Wikipedia Image of Natural Formed Bitumen Collected at Dead Sea Shore from 2007 (Year: 2024).*

Wayback Machine of IKO Easy Melt Sale Page from Dec. 25, 2017 (Year: 2024).*

"How 4 Millions Fossils are Extracted From Tar at La Brea Tar Pits" https://www.youtube.com/watch?v=ZMuxQWvok2M (Year: 2022).*

Bitcrude.Ca, Bitcrude Energy's Success of Commercial Scale, Diluent-Free, Non-Toxic Heavy Oil Shipping Process Revolutionizes Access to Offshore Markets, Press Release, Jan. 11, 2021, published online at https://www.bitcrude.ca/s/BitCrude-Media-Release-January-2021-Final-For-Distribution-11.pdf.

McClelland, Collin, Alberta-based company tests shipping oilsands in solid form to China as way around oil tanker ban, Financial Times, Sep. 26, 2019, published online at https://business.financialpost.com/commodities/energy/alberta-based-company-tests-shipping-oilsands-in-solid-form-to-china-as-way-around-oil-tanker-ban.

Binkley, Alex, Melius Energy launches bulk bitumen shipping in containers—CanaPux to commercialize heavy oil capsules in 2021?, Canadian Sailings Transportation and Trade Logistics, Dec. 8, 2019, published online at https://canadiansailings.ca/melius-energy-launches-bulk-bitumen-shipping-in-containers-canapux-to-commercialize-heavy-oil-capsules-in-2021/.

Bakx, Kyle, CN Rail, First Nation plan to break ground on new 'bitumen puck' facility this year, CBC.ca, Jan. 17, 2019, published at https://www.cbc.ca/news/business/cn-rail-canapux-1.4982153.

Fletcher, Tom, 'Canapux' may be next to ease B.C.'s heavy oil shipping pressure, Terrace Standard, Dec. 28, 2018, published online at https://www.terracestandard.com/business/canapux-may-be-next-to-ease-b-c-s-heavy-oil-shipping-pressure/.

Morgan, Geoffrey, Now there's a way to get Alberta oil to market without pipelines—and recycle plastic at the same time, Financial Post, Jan. 18, 2019, published at https://financialpost.com/commodities/cn-rail-first-nations-company-partner-to-build-bitumen-pucks-plant.

Williams, Chloe, Canadians found a safer way to transport oil and, yes, it looks like a hockey puck, Popular Science, Jan. 28, 2019, published online at https://www.popsci.com/hockey-puck-tar-sands-canada/.

Canadian railway researching concept of bitumen bricks as safer alternative for oil transport, HazardEx, Nov. 13, 2018, published online at https://www.hazardexonthenet.net/article/163021/Canadian-railway-researching-concept-of-bitumen-bricks-as-safer-alternative-for-oil-transport.aspx.

International Search Report and Written Opinion of the International Search Authority for PCT/US2022/051093 dated May 11, 2022, Canadian Intellectual Property Office.

International Search Report and Written Opinion of the International Search Authority for PCT/US2022/051094 dated May 16, 2022, Canadian Intellectual Property Office.

International Search Report and Written Opinion of the International Search Authority for PCT/US2022/051095 dated May 10, 2022, Canadian Intellectual Property Office.

International Search Report and Written Opinion of the International Search Authority for PCT/US2022/051091 dated May 5, 2022, Canadian Intellectual Property Office.

Farhan Khan, Bituminous Materials Asphalt and Tars, Construction How, Jun. 9, 2020, published online at https://www.contructionhow.com/bituminous-materials/.

* cited by examiner

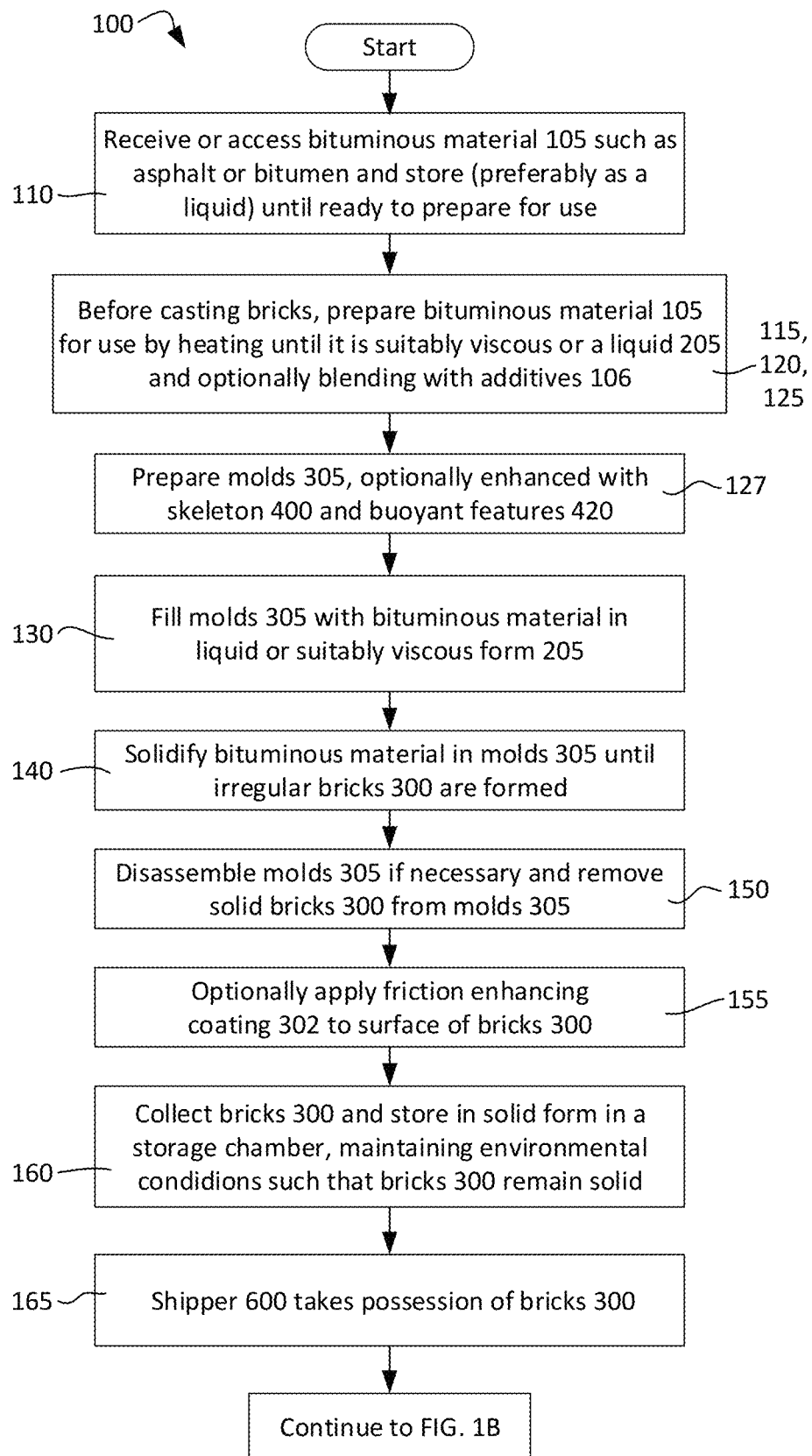

SOLID FORMATIONS OF NON-VOLATILE BITUMINOUS MATERIALS SUITABLE FOR REDUCING CARBON DIOXIDE EMISSIONS DURING TRANSPORT

FIELD OF THE INVENTION

The present invention relates to bituminous materials including bitumen, polymer modified bitumen, heavy crude oil, extra heavy crude oil, asphalt, polymer modified asphalt, and more particularly, to solid formations of bituminous materials and methods for preparing, storing, and transporting bituminous materials without added diluent.

BACKGROUND OF THE INVENTION

The worldwide demand for crude oil has grown to almost 100 million barrels per day, driving the need to exploit other hydrocarbon sources as well as alternative energy resources. Two resources of interest are heavy crude oil and bitumen, which make up more than two thirds of oil reserves globally. Heavy crude oil has an API gravity below 20°, and bitumen is the heaviest crude oil used today with an API gravity of less than 10°. Heavy crude oil and bitumen are more challenging to produce, transport, and refine than conventional light oil due to their increased viscosity and density.

Current methods to recover and process heavy crude oil and bitumen are evolving, with a particular emphasis on accessing oil in the vast oil sands of Venezuela and Canada. In Canada, the third largest exporter of oil in the world, 97% of its proven oil reserves are located in the oil sands region. Bitumen is extracted from the oil sands either by mining or by using enhanced oil recovery techniques such as thermal, solvent displacement, chemical, and microbial methods. Thermal techniques, in particular, are widely used and include steam flooding, cyclic steam stimulation, steam assisted gravity drainage, in situ combustion, and toe-to-heel air injection. About 80% of Canada's oil sands reserves are accessible via enhanced recovery techniques, with steam assisted gravity drainage being the most widely used recovery method.

After the bitumen is extracted, it must be upgraded or diluted in order to be pipelined or used as feedstock in refineries. Upgrading bitumen transforms it into synthetic crude oil (SCO) that can be refined and marketed as consumer products such as diesel and gasoline. In general, upgrading breaks down the heavy molecules of bitumen into lighter and less viscous molecules, and some bitumen is further upgraded through purification and distillation to remove unnecessary impurities such as nitrogen, sulfur, and trace metals so that it can be used as feedstock for oil refineries. Alternatively, bitumen can be diluted using either conventional light crude or a cocktail of natural gas liquids. The resulting diluted or cutback bitumen, often referred to as dilbit, has the consistency of conventional crude and can be pumped through pipelines. The diluents used to dilute bitumen vary depending on the particular type of dilbit being produced, and the most widely used diluents include condensate from natural gas production, naphtha, kerosene, and lighter crude oils. Often, diluents are mixtures that include benzene, a known human carcinogen.

Diluting bitumen with diluent is necessary to transport bitumen through pipelines and generally favored for transport via rail. Over 95% of the heavy crude oil and bitumen produced in Canada and Venezuela, for example, is transported through pipelines from the field to the refinery. The blend ratio of dilbit may consist of 25%-55% diluent by volume, depending on characteristics of the bitumen and diluent, pipeline specifications, operating conditions, and refinery requirements. Once the dilbit arrives at its intended location, the diluent can be removed by distillation and reused. Otherwise, the entire dilbit can be refined, but dilbit is more difficult to process than typical crude oil due to hydrocarbons at the extreme ends of the viscosity range.

While diluting bitumen with diluent allows it to be transported more easily through pipelines, there are several risks and disadvantages associated with dilbit. For example, producing dilbit is associated with excessive costs and a large carbon footprint. Two significant risks of dilbit are pipeline ruptures and oil spills, which has discouraged shipping dilbit to overseas locations despite their great needs. When a pipeline or tanker carrying dilbit ruptures, unstable dilbit briefly floats in water but heavier components skink as light components evaporate. As a result, cleanup is more difficult and there are concerns about the impact on fish and other animals' reproductive cycles. In marine environments where dilbit continues to float, it is harmful to a wide range of marine animals, including sea otters, baleen whales, fish embryos, and juvenile salmon. Additionally, any evaporated components of dilbit impact air quality. For example, when a pipeline carrying dilbit ruptured and spilled into the Kalamazoo River in Michigan, the local health department issued voluntary evacuation notices to nearby residents based on the elevated level of benzene measured in the air.

After the diluent is removed from bitumen, some applications require additional additives to improve the function of the bitumen for certain applications. Bitumen generally is brittle in cold environments and softens readily in warm environments. In order to improve its strength, cohesiveness and resistance to fatigue and deformation, bitumen is often blended with asphalt binders such as polymers, either virgin or scrap, to produce polymer modified asphalt. Polymer modified asphalt is typically used on road pavements, particularly those that are intended to withstand heavy-duty traffic and extreme weather conditions. This material is also used as a sealant in residential roofing applications.

Given the disadvantages and risks associated with dilbit, it would be desirable to prepare and transport bituminous materials, which include heavy crude oil, extra heavy crude oil, bitumen, asphalt, and polymer modified asphalt without diluents and to prepare and transport polymer modified bituminous materials without diluents. It would further be desirable to prepare bituminous materials and polymer modified bituminous materials for transport via rail, truck, and shipping lines to avoid the risks associated with pipeline ruptures. It would also be desirable to prepare bituminous materials and polymer modified bituminous materials for transport in a manner that would increase buoyancy if spilled into aquatic environments, making it easier to clean up should any spill into lakes, rivers, or oceans.

SUMMARY OF THE INVENTION

An irregular solid formation of non-volatile bituminous materials presents solutions for reducing the harmful environmental impacts currently associated with transporting bituminous materials. Methods of preparing, transporting, storing, and receiving the bituminous materials involves first receiving or accessing non-volatile bituminous materials, which include asphalt, polymer modified asphalt, bitumen, polymer modified bitumen, oils, other high molecular weight hydrocarbons, and non-bituminous materials or polymers with thermoplastic and viscoelastic properties that are stable at room temperature and face transportation challenges similar to those of bitumen, to receiving locations around the world. The bituminous material can be accessed or received in a solid, semi-solid, or liquid state but preferably is in a liquid or suitably viscous state, and any diluent that may have been used to extract the bituminous material will have been removed prior to accessing or receiving it. The bituminous material can then be prepared for transport by casting it into a solid formation with an irregular shape. Shortly before casting, the bituminous material is first prepared for casting. It is preferably heated to a predetermined casting temperature where the bituminous material reaches a suitable viscosity for casting and optionally blended with polymers or other additives. After being prepared, the bituminous material is then introduced to one or more molds, each of which is configured to cast an irregular solid or brick. Preferably, suitably viscous bituminous material is introduced to molds further configured with a customizable polymer skeleton, which is optionally and preferably further configured with buoyant features such as encapsulated air or other substances, to create a buoyant and polymer-enhanced irregular solid or brick. After the molds have been filled, the bituminous material is solidified, and multiple bricks are formed having the irregular shape defined by the mold. The irregular shape is configured to reduce surface contact with adjacent bricks when collected together in a container and defined by multiple non-planar face surfaces. Preferably each of the resulting bricks have a shape similar to that of a modified tetrahedron. The molds and solid bricks that they produce are scalable in size depending on industry needs. After removing the bricks from the molds, optionally a friction enhancing coating can be applied.

Several bricks can be cast at once using a series or group of multi-part molds that are assembled and moved through several stations on a conveyor or other manufacturing system. Stations include, for example, those for preparing, filling, capping, solidifying, mold-disassembling, and brick removal. With such a system, preferably after preparing the bituminous material so it is suitably viscous, the viscous bituminous material is transferred to and contained in a vessel with a retractable conduit delivery system at a filling station so that the viscous bituminous material can be introduced to the molds progressively from the bottom of the molds to the top as the conduit retracts. A capping station can further supply and apply a cap to the access point for the retractable conduit. At the solidifying station, the molds and bituminous material can be solidified with any industrial system capable of causing the bituminous material to solidify. After solidifying, the bricks can be moved to a station where the mold parts are disassembled or separated. For example, the station may include a vacuum or mechanical system that removes the caps and upper portions of the molds to reveal the bricks. Once exposed, the bricks can be removed manually, mechanically, or with gravity assistance at a brick removal station. Additional stations can be present where the molds are cleaned or replaced and where coatings or other treatments are applied to the bricks. Stations also can be combined or further broken into substations as needed.

After several bricks are formed, they can be collected for transport and delivered to or picked up by a shipper. Once the shipper takes possession of the bricks, the shipper transports the bricks by rail, truck, air, or boat to a receiving location such as one affiliated with a distributor, an end-user of asphalt, or a refinery that plans to further process the bituminous material. The bricks preferably are transported in a containment manner such as a dedicated aerodynamic transport chamber with passive environmental control systems or features. For example, the transport chamber may include a plurality of vents that allow ambient air to enter and circulate through and among the bricks, including around all sides of each individual brick. Alternatively, the transport chamber may include a water distribution system that draws in ambient water and sprinkles it over and through the bricks. Preferably during transport, the bricks are continuously or intermittently exposed and substantially surrounded with water, air, cooled air, or other substances that help maintain the bricks in a solid form. More preferably, the desired environment within the transport chamber holding the bricks is maintained simply by the flow of air, water, or other substance that naturally occurs as the vehicle carrying the transport chamber moves, which minimizes energy needs. In addition to the benefits that result from transporting bituminous materials without diluent and not having to heat bituminous material to transport it by vehicle as a liquid as is the current practice, using low- or zero-emissions vehicles to carry transport containers with passive environmental control systems further reduces or eliminates harmful carbon dioxide emissions.

Once the bricks reach the receiving location, the recipient can store the bricks in the transport chambers or transfer them to receivers including receiving chambers that allow for continued active or passive environmental control. For example, the bricks can be stored as bricks in large floating or gravity storage chambers that allow water, air, or other substances that help control the environment to circulate around or among the bricks. Alternatively, the bricks can be reheated until they return to a liquid state or their original state. Optionally, the bricks can be transferred to a specialized storage chamber having a heat-imparting removable concave receiving lid. Should the customer or recipient want to store bricks in their solid form such as when the bituminous material is asphalt or polymer modified asphalt, specialized storage container can be used without the removable receiving lid. Should the customer or recipient want to reliquefy the bricks such as when the bituminous material is bitumen or polymer modified bitumen, the specialized storage container is used with the removable receiving lid, which is preferably configured with a radiant heating system for melting the bricks as they collect on the lid. A delivery system such as drainage holes positioned about the lid funnel the melted bituminous material from the top of the lid into the chamber below where the melted bituminous material can undergo further processing to remove or distribute the skeleton or any additive previously introduced. For example, the now-melted polymer skeleton can be skimmed off at the receiving location or further blended into the bituminous material. Finally, the recipient can further process the bituminous material according to their needs and optionally recast the bituminous material into bricks using the systems and methods described herein.

Transporting bituminous materials as irregular solid bricks provides several advantages over traditional methods where continuous heat, added diluent, or both was necessary to move bituminous materials from one location to another in a cost-effective way. By substantially removing diluent and any other harmful additives, the resulting bituminous material is non-volatile and unlikely to burn given its higher flash- and fire-points. As a result, it can travel more readily by vehicle, which reduces reliance on pipelines, and the threat to the environment is reduced or eliminated, especially should any bituminous spill during transport. By further enhancing the bricks of bituminous material with customized skeletons or other buoyant features, bricks are unlikely to sink if they are spilled into marine environments and deliverable to customers with preferred rather than excess amounts of polymer or other additives. By eliminating the need to heat the bituminous material as it travels, reliance on fossil fuels is decreased, and when traditional vehicles and shipping containers are replaced with low-emissions or zero-emissions vehicles carrying transport chambers incorporating passive environmental control systems and features, carbon dioxide emissions are significantly reduced.

BRIEF DESCRIPTION OF THE DRAWINGS

FIG. 1A is a flowchart representing the process of manufacturing bituminous material for transport in solid form according to an embodiment of the present invention.

FIG. 24A is an illustration of a filling station of the exemplary process of molding bricks shown in FIG. 22 at the moment when bituminous material is beginning to fill the mold.

FIG. 24B is an illustration of the filling station of the exemplary process of molding bricks shown in FIG. 22 at the moment when bituminous material has filled about half of the mold.

FIG. 24C is an illustration of the filling station of the exemplary process of molding bricks shown in FIG. 22 at the moment when bituminous material has almost filled the mold.

FIG. 24D is an illustration of the filling station of the exemplary process of molding bricks shown in FIG. 22 at a moment after bituminous material has filled the mold and the retractable conduit has been removed from the mold.

FIG. 25A is an illustration of the capping station of the exemplary process of molding bricks shown in FIG. 22 before a cap has been applied.

FIG. 25B is an illustration of the capping station of the exemplary process of molding bricks shown in FIG. 22 as the cap is being applied.

FIG. 25C is an illustration of the capping station of the exemplary process of molding bricks shown in FIG. 22 after the cap has been applied.

DETAILED DESCRIPTION OF PREFERRED EMBODIMENTS

Figure 1B:
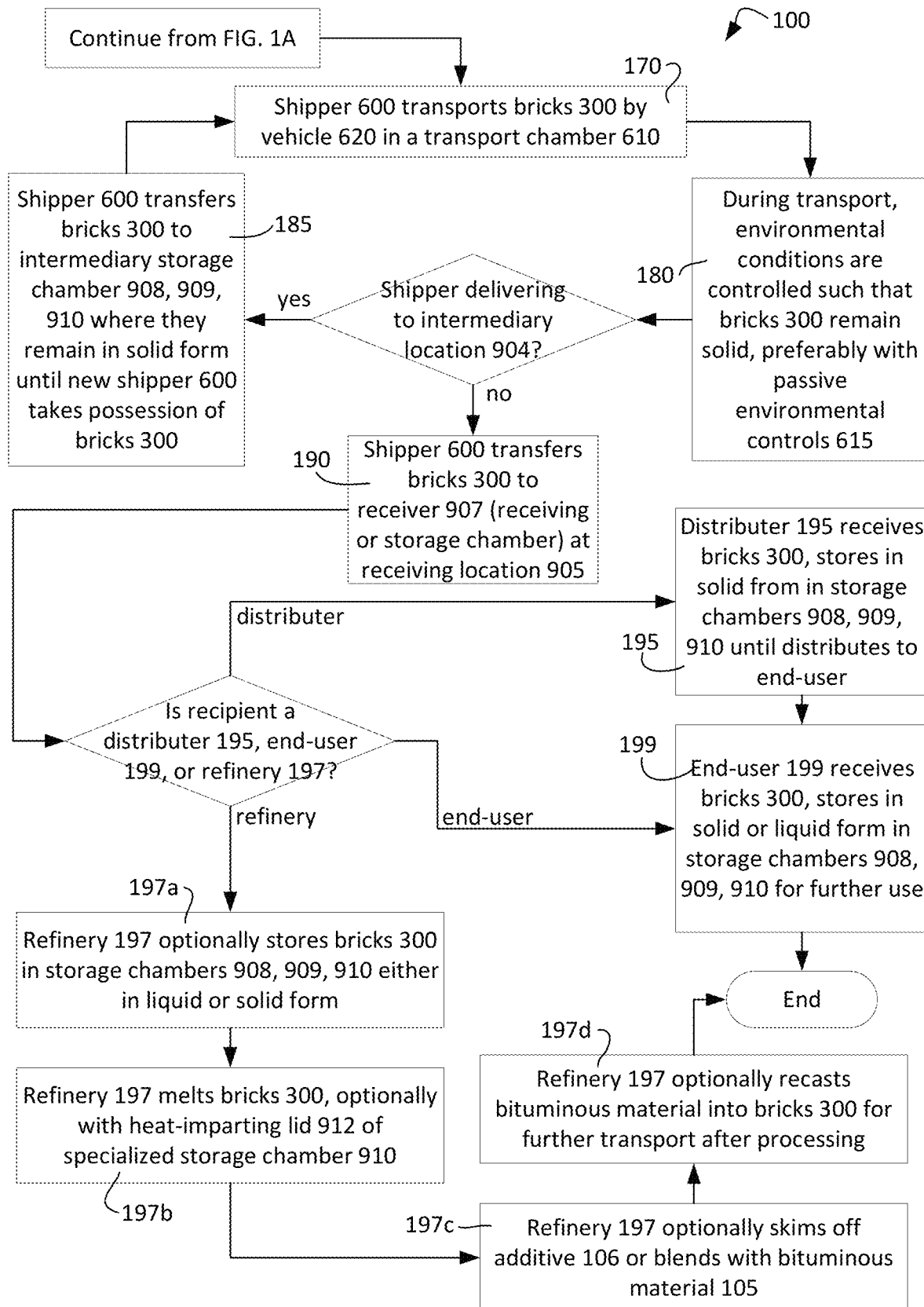
FIG. 1B is a flowchart representing the process of transporting to receivers the solid forms of bituminous materials according to an embodiment of the present invention.

FIGS. 1A and 1B illustrate the preferred embodiment of the overall process 100 of solidifying, transporting, storing, and receiving bituminous material 105 without diluent, also referred to herein as neatbit or non-volatile bituminous material 105, to receiving locations 905 such as those belonging to distributors, end-users, and refineries. The terms "bituminous material," "heavy oil," "extra heavy crude oil," "heavy crude oil," "heavy crude," "bitumen," "asphalt," "bituminous material 105," and "bituminous materials 105" used independently herein or in any combination herein shall be understood to cover any type of oil, and any application thereof, that falls within the U.S. Geological Survey's (USGS) definition of heavy oil and bitumen as described in USGS Fact Sheet 70-03 and further includes heavy crude oil, extra heavy crude oil, bitumen, and asphalt. Additionally, it includes, for purposes of this invention, other high molecular weight hydrocarbons and other non-bituminous materials or polymers with thermoplastic and viscoelastic properties that are stable at room temperature and face transportation challenges similar to those of bitumen. Additionally, any reference to bricks 300 herein includes bricks formed from any of the bituminous materials defined above, and any reference to bituminous material 105 being clean, neat, or non-volatile herein includes bituminous material without diluent or bituminous material with substantially reduced diluent. For example, bricks 300 may be comprised of bitumen, polymer modified bitumen, asphalt, or polymer modified asphalt, or bricks 300 may be made of custom blends of bituminous materials requested by a customer.

Figure 2:
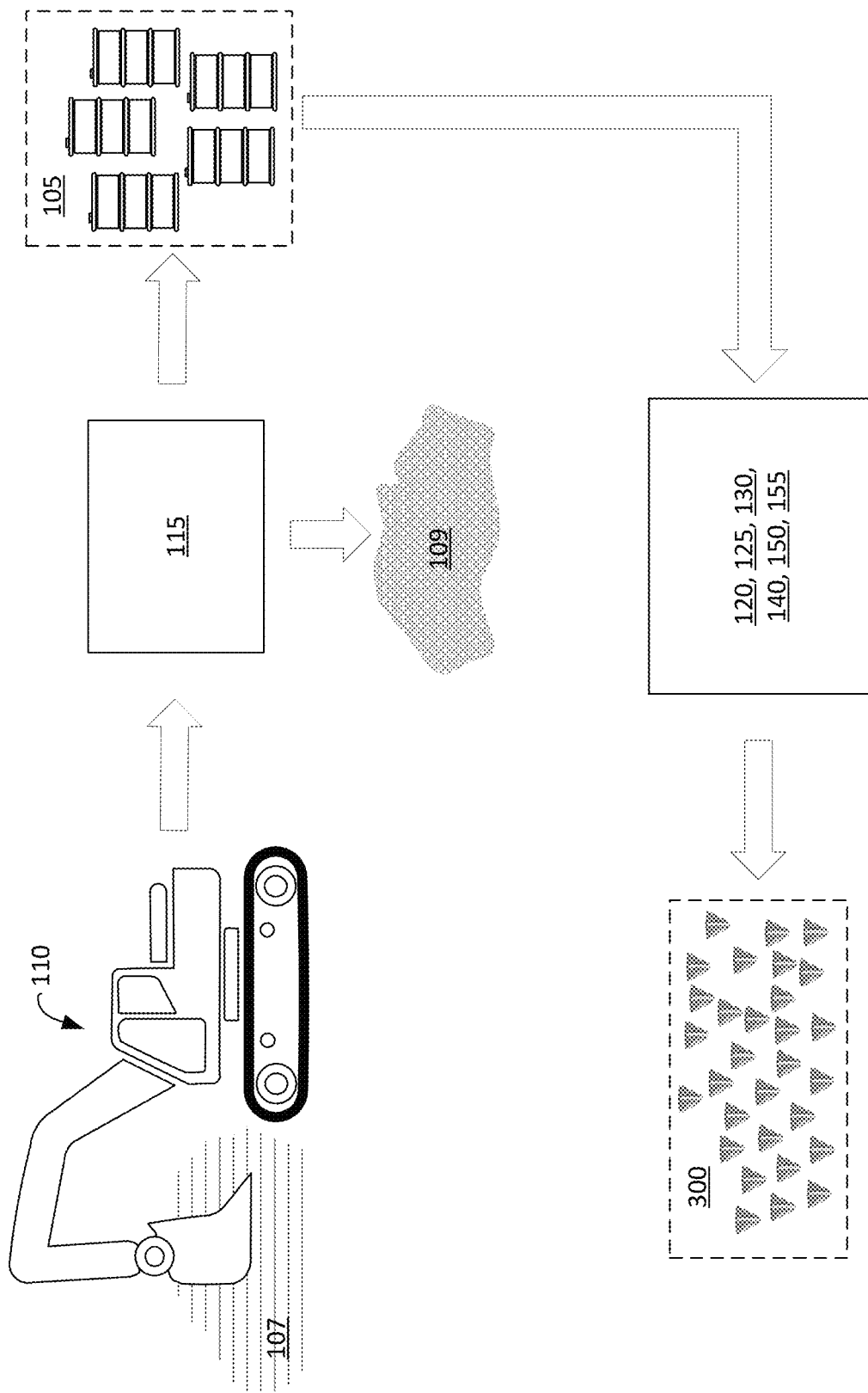
FIG. 2 is an illustration of the process of taking bituminous materials extracted according to known methods and preparing it for transport in solid form according to embodiments of the present invention.

Before solidifying, transporting, storing, and receiving bituminous material 105 according to the present invention, bituminous material 105 may have been extracted from the oil sands 107 as shown in FIG. 2 or obtained from other sources or locations. For example, bituminous material may have been extracted from the oil sands 107 by mining, steam assisted gravity drainage (SAGD), solvent assisted steam assisted gravity drainage (SA-SAGD), and cyclic expanding-solvent steam assisted gravity drainage (ES-SAGD). If diluent was used to extract the bituminous material 105, the diluent and any other undesirable materials should be removed from the bituminous material 105, and the diluent optionally can be recycled. It then can be made available to a manufacturer as a solid, semi-solid, or preferably a liquid for processing and casting according to the present invention.

The terms "solid" and "solidifying" bituminous material 105 as used herein mean to take a form, and to cause to take a form, that behaves practically like a solid mass including one where it has not changed phase yet resists flow and manifests structural integrity. As shown in FIG. 1, bituminous material 105 is first received or accessed 110 and then prepared 115 for casting. Preparing 115 for casting includes heating 120 the bituminous material 105 to a temperature that melts or causes it to become a liquid or suitably viscous state 205 and then optionally blending 125 it with an additive 106 such as a polymer to enhance its buoyancy or act as an asphalt binder. Next, bituminous material 105 in its liquid or suitably viscous state 205 is introduced 130 to one or more molds 305, each of which is configured to mold its contents into an irregular solid that is configured with little or no similar dimensions on a given surface section in order to reduce surface-to-surface contact between adjacent bricks and thereby maximize the efficiency of cooling around the bricks as they are transported from one location to another. Each mold preferably is configured with a skeleton 400 that is more preferably made of a polymer, further configured to support additional or integral buoyant features 420, and positioned across and throughout the mold 305. Both the skeleton 400 and buoyant features 420 can be customized to meet the needs of a customer. Once the liquid or suitably viscous bituminous material 205 has filled the molds 305, the bituminous material in molds 305 is solidified 140 until bricks 300 are formed. Each brick 300 is an irregular solid that preferably resembles a modified tetrahedron. The molds 305 and resulting bricks 300 are scalable in size depending on industry needs. The molds are disassembled where needed and bricks 300 are removed 150 from molds 305 manually, mechanically, or with the assistance of gravity. Bricks 300 are next collected 160 for eventual transport and preferably temporarily stored in solid form in storage chambers 908, 909, 910 until a shipper 600 can take possession. Optionally, a friction enhancing coating 302 can be applied 155 to the surface of bricks 300 before or after they are collected. Skeleton 400, buoyant features 420, bricks 300, molds 305, and friction enhancing coatings 302 are discussed below.

After a desired number of bricks 300 are molded and collected, a shipper 600 takes possession 165 of the plurality of bricks 300 to transport 170 them in a transport chamber 610 or other containment manner that preferably includes an environmental control system 615. For example, the transport chamber 610 can actively, such as with refrigeration systems, or passively, such as with vents and choice of color and materials, introduce and circulate air or water so that it flows therethrough and substantially around 180 the sides of each individual brick 300. Shipper 600 transports 170 the transport chamber 610 and plurality of bricks 300 by rail, road, air, sea, or any combination thereof, such as with intermodal or multimodal shipping, to an intermediary location 904 or the receiving location 905 of a customer. Shipper 600 can use any vehicle capable of carrying cargo or freight, and the term "vehicle" and "vehicles" as used herein includes all widely used and emerging transportation and logistics systems including trains, trucks, airplanes, vans, trailers, tankers, cargo ships, drones, trolleys, tubes, and autonomous cargo ships, freight trains, freight airplanes, and other driverless systems. Additionally, "vehicle" and "vehicles" include specialty vehicles with dedicated or integral transport chambers 610. Preferably, shipper 600 uses low- or zero-emissions vehicles to carry transport chambers 610, which further reduces or eliminates carbon dioxide emissions. Intermediary locations 904 typically are those where bricks 300 may need to be transferred from one vehicle to another such as when bricks 300 travel by both rail and ship.

At a receiving location 905, bricks 300 can be transferred immediately as bricks 300 to a new shipper 600, kept in intermediary storage chambers as bricks 300 until a new shipper 600 can take possession, or placed in storage chambers and kept as bricks 300 or in liquid form until a customer 195, 197, 199 can take possession. Receiving locations 905 include any locations capable of receiving bricks 300 and includes those associated with intermediaries 185, distributors 195 who will eventually distribute bricks to end-users 199, end-users 199 that may, for example, want to receive bricks 305 of asphalt, or refineries 197 that may, for example, want to reliquefy, further process, and then recast the bitumen into bricks 300 to transport to an end-user 199. During transport 170, preferably an environmental control system 615 continuously or intermittently causes air, water, or other substances to circulate among bricks 300 in chamber 610 to help maintain 180 them in a solid form, as discussed below.

Once bricks 300 reach an intermediary location 904 or receiving location 905, they can be stored in their current transport chambers 610 or transferred 190 to receivers 907 such as receiving chambers that preferably are also configured with active or passive environmental control systems 615, including those that allow for continued air, water, or other substances to flow therethrough, to help maintain a suitable environment for the contents of the receiving chambers. Preferably, bricks 300 are stored in receiving chambers that are large floating storage chambers 909 if at a port or gravity storage chambers 908 if on land, where both storage chambers 908, 909 allow temperature- or climate-maintaining substances to circulate among the bricks 300. Alternatively, especially if a receiving location 905 is affiliated with a refinery where bricks 300 might be reheated until they return to a liquid state or their original state, bricks 300 can be transferred to a specialized storage chamber 910. The specialized storage chamber 910 facilitates either storing bricks 300 in their solid form or reheating 190 bricks 300 with a heat-imparting lid to return the bituminous material 105 to a liquid or suitably viscous state.

If bricks 300 have been delivered to a distributor 195 or to an intermediary location 904, bricks 300 are stored 195 in their solid form until they can be delivered to an end-user 199 or another shipper 600. If bricks 300 have been distributed to an end-user 199 such as an end-user of asphalt, the bituminous material 105 may be turned into a liquid or kept as bricks 300 for immediate use. Alternatively, if bricks 300 have been received by a refinery 197 wanting bitumen or a customer looking to further process the bituminous material 105 before transporting to end-users 199, bricks 300 can be stored 197a in solid or liquid form and then optionally returned to a liquid or suitably viscous state 197b. The liquified bituminous material 205 also can be further processed 197c. For example, additives can optionally be skimmed off or further blended into the bituminous material 105, and additional additives or treatments can be introduced or applied before optionally recasting 130 the liquid or suitably viscous bituminous material 205 into bricks 300 for further transport.

Formation of Bricks

FIGS. 21A-25C illustrate an exemplary mold and process for forming irregular solid bituminous material bricks 300 from liquid or otherwise suitably viscous bituminous material 205. After receiving bituminous material in solid, semi-solid, or liquid form, the bituminous material 105 can be stored until shortly before it will be cast into bricks 300. When casting is imminent, for example within the next twenty-four hours, the bituminous material 105 is first prepared for casting at a preparation station 117 where it is heated until it reaches a temperature where the bituminous material liquifies or becomes suitably viscous for molding. Preferably, bituminous material 105 is heated to at least or about 150 degrees Celsius. Because bitumen softens gradually over a range of temperatures, the temperature suitable for casting can vary depending on the composition of the bituminous material 105 being softened or melted. Additionally, after the bituminous material 105 reaches the desired consistency, optional additives 106 can be blended into the bituminous material 105 at preparation station 117. Next, bituminous material 105 can be cast 130 immediately in a mold or stored in the liquid or suitably viscous state for refinement and casting at a later time.

When ready to form solid bricks 300, the suitably viscous bituminous material 205 is introduced to molds 305 for casting 130 into irregular solids or bricks 300. FIGS. 21A-21E illustrate an exemplary mold 305 useful for casting bricks 300 of an irregular solid shape according to the preferred embodiment as described herein and shown in FIGS. 3A-6B. Preferably, each mold 305 is configured with a cavity 810 corresponding to the size, shape, and volume of the desired irregular solid to be formed. Each mold 305 is further preferably configured with a skeleton 400, which is more preferably a three-dimensional lattice or grid of polymer fiber groups supporting buoyant features 420 that is positioned or strung throughout each mold 305. Skeleton 400 is discussed further below and shown in FIGS. 7-11.

Preferably each mold 305 comprises two parts, a first mold part 800 that defines a first cavity 810a corresponding to a large portion of the resulting brick 300 and a second mold part 805 that defines a second cavity 810b corresponding to the top portion of the resulting brick 300. First mold part 800 has an upper surface 800a, a lower surface 800b, and one or more walls 800c extending from the upper surface 800a to the lower surface 800b. Together, upper surface 800a, lower surface 800b, and walls 800c encase or define the boundaries of a preferably solid first mold part 800. Additionally, first mold part 800 defines first cavity 810a, which extends from upper surface 800a toward, but not through to, lower surface 800b. Additional cavities 810a can be defined by first mold part 800 as well, which would facilitate casting multiple bricks 300 or brick parts in a single mold.

Second mold part 805 also has an upper surface 805a, a lower surface 805b, and one or more walls 805c extending from the upper surface 805a to the lower surface 805b. Together, upper surface 805a, lower surface 805b, and walls 805c encase or define the boundaries of a preferably solid second mold part 805. Additionally, second mold part 805 defines a second cavity 810b, which extends from lower surface 805b toward but not through to upper surface 805a. Second mold part 805 also defines a channel 807 extending from its upper surface 805a to second cavity 810b to provide access to cavity 810 from outside of mold 305. Channel 807 is preferably positioned at or near the center of upper surface 805a but can be positioned elsewhere depending on the shape of the brick 300 to be cast and the needs or desires of the manufacturer. Additional cavities 810b and/or channels 807 can be defined by second mold part 805 as well. Additional cavities 810b allow for multiple bricks 300 or brick parts to be cast in a single mold, and additional channels 807 may speed up processing by allowing for multiple access points to cavity 810 from the outside of mole 305 or allow for independent access to each cavity 810 where multiple bricks 300 or brick parts will be cast in a single mold.

Preferably first and second mold parts 800 and 805 also have the same or complimentary overall configurations and shapes as well. For example, the walls 800c and 805c extending from the upper surfaces 800a and 805a to lower surfaces 800b and 805b of upper and lower mold parts 800 and 805 respectively can be four connected walls oriented at right angles so that mold parts 800 and 805 have upper and lower surfaces that appear substantially square in shape as shown herein, a single continuous wall connected at its end such that mold parts 800 and 805 have upper and lower surface that appear substantially circular or oval in shape, or any other configuration or shape as desired. Moreover, while walls 800c and 805c are illustrated as extending at right angles relative to the mold parts 800 and 805 upper and lower surfaces, walls 800c and 805c can have a varying slope, be slanted, or be irregular depending on the brick 300 shape to be case and the needs or desires of the manufacturer. Preferably, mold parts 800 and 805 are sized and shaped to cooperate with trays, modules, or other support and carrying structures used in manufacturing.

First and second mold parts 800 and 805 are configured such that when removably attached or positioned next to one another, the lower surface 805b of second mold part 805 cooperates with the upper surface 800a of the first mold part 800. For example, the lower surface 805b of second mold part 805 may simply rest on the upper surface 800a of first mold part, staying in place due to gravity or friction, or it may be removably secured with fasteners, adhesives, or other means depending on the desired fit and ease of assembly and disassembly. Additionally, when first and second mold parts 800 and 805 are removably attached or positioned next to one another, complimentary cavities 810a and 810b cooperate to define a single cavity 810 or multiple cavities 810, each of which has the desired overall shape of the brick 300 or parts to be cast.

Figure 23A:
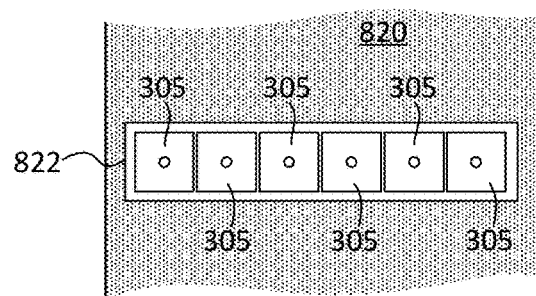
FIG. 23A is a top view of a plurality of bricks positioned on a conveyor according to the preferred embodiment of the present invention.
Figure 23B:
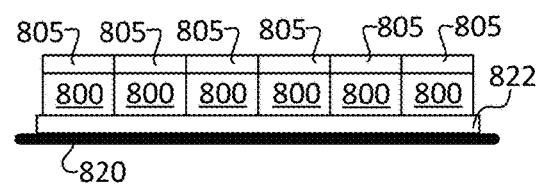
FIG. 23B is an end view of the plurality of bricks on the conveyor shown in FIG. 23A.
Figure 23B:
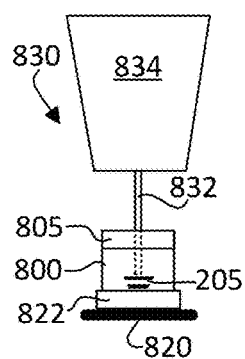
Figure 23B:
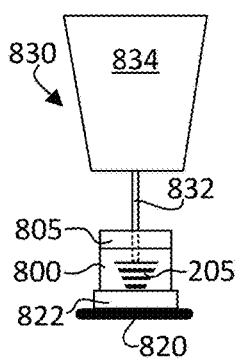
Figure 23B:
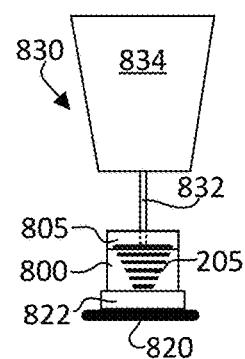
Figure 23B:
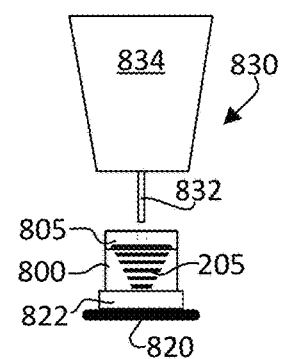
Figure 23B:
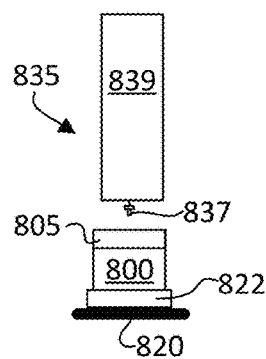
Figure 23B:
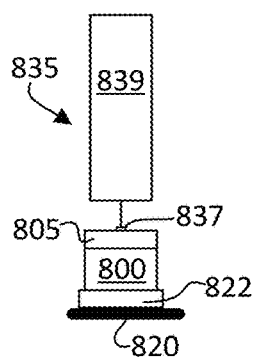
Figure 23B:
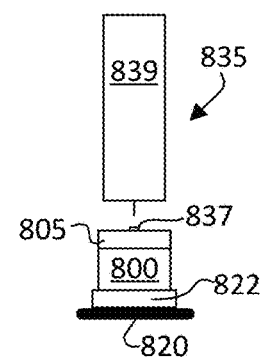

FIGS. 23A-25C illustrate the production stations according to an exemplary casting process 815 where several molds 305 are filled with the suitably viscous or liquid bituminous material 205 at once. Preferably, a plurality of first parts 800 of molds 305 are removably attached in groups along a conveyor belt 820, and their corresponding second parts 805 are removably attached to or positioned on the first parts 800 of the molds at a distance from the belt 820 at a first or initial station 825, as shown in FIGS. 23A and 22B. Conveyor 820 can be any type of conveyor including an automated belt conveyor, and first parts 800 can be attached to it with brackets, a tray 822, using modules, or with other support structures as will be known to those skilled in the art. While the Figures show six molds 305 arranged in a single row across conveyor 820, it shall be understood that the number of parts in a group can be scaled up or down and can be configured in multiple rows or other configurations depending on manufacturing needs and capabilities.

After being arranged and assembled, the plurality of molds 305 are transported by conveyor 822 to a second location or filling station 830 where molds 305 can receive suitably viscous or liquid bituminous material 205 via channels 807 in second mold parts 805. Filling station 830 preferably includes one or several vessels 834 that are directly or indirectly in fluid communication with the preparation station 117 so that they can receive a supply of suitably viscous bituminous material 205. Vessels 834 hold, deliver, or hold and deliver the suitably viscous bituminous material 205 to one or several molds 834 via one or several retractable pipes or conduits 832 that are in fluid communication with the vessel 834 or vessels 234. Vessels 234 can be any structure capable of holding, carrying, or facilitating delivery of viscous or liquid bituminous material 205. Each retractable conduit 832 is sized such that it can descend into a cavity 810 within a mold 305 through a single channel 807 and configured so that it is in fluid communication with the cavity 810 when positioned at least partly in channel 807 of mold 305. Each retractable conduit 832 provides a path from vessel 834 to a cavity 810 for the liquid bituminous material. When the plurality of molds 305 are at filling station 830, first and second mold parts 800 and 805 are filled with suitably viscous or bituminous material 205 from the bottoms of the first mold parts 800 and up to the tops of the second mold parts 805 as retractable conduits 832 retract, which is shown in FIGS. 24A-24D. Doing so improves the quality of the resulting bricks as each mold 305 is filled progressively for consistent consolidation in shape and to accommodate the skeletons 400 positioned within the mold 305. Preferably, skeletons 400 positioned within molds 305 are configured and arranged so that they do not interfere with the retractable conduits 832 as they fill molds 305.

After the suitably viscous bituminous material 205 fills the plurality of mold parts 800 and 805 and consequently molds 305 and after all retractable conduits 832 have been retracted from channels 807, molds 305 are preferably transported by belt 820 to a third location or capping station 835. Capping station includes a cap structure 839 for holding, carrying, or otherwise facilitating delivery of caps 837. Each cap 837 is configured to cooperate with one of channels 807 to block access to or seal the respective cavity 810 within molds 305. Caps 837 include cap alternatives including stoppers, plugs, tops, seals, or other mechanical barriers. FIGS. 25A-25D illustrate a cap 837 being applied to a channel 807 of a second mold part 805 when mold 305 is at capping station 835. While capping station 835 is shown as an independent station in the Figures, it shall be understood that it can be combined with the station immediately before or after it where feasible and depending on manufacturing needs and capabilities. For example, molds 305 can receive the liquid bituminous material 205 and have caps 837 applied at the same station.

After molds 305 have been capped with caps 837, the bituminous material in cavities 810 can be solidified. Preferably, molds 305 are transported by belt 820 to a fourth location or solidifying station 840, which includes a solidification system 842. Solidification system 842 can use water, air, pressure, or other solidification methods and tools 844. Solidification system 842 can be any type of industrial system commonly used to cast parts by solidifying viscous material provided the system is capable of solidifying bituminous material. Preferably, molds 305 and suitably viscous bituminous material 205 are solidified by cooling them to room temperature or a temperature below 25 degrees Celsius, although the exact temperature will depend on the composition of bituminous material 105.

After the bituminous material solidifies to create bricks 300, each brick 300 is ready to be removed from each mold 305 and transported. To remove each brick 300 from its mold 305, the group of molds 305 and their contents are preferably moved via the belt 820 from the solidifying station 840 to a fifth location or mold-disassembling station 850 where the second mold parts 805 can be removed or separated from the first mold parts 800. At the mold-disassembling station 850, a vacuum 854 or other removal device or machine connects with second mold parts 805 to facilitate its separation from the first mold parts and subsequent removal. Where a vacuum 854 is used, preferably a vacuum cup 852 clamps onto the upper surface 805a of each second mold part 805. Vacuum cups 852 operationally connect with vacuum 854 to pull second mold parts 805 away from first mold parts 800. Once separated, second mold parts 805 can be removed from vacuum cups 852 for cleaning, repair, cap removal, further configuration, or other processing. While a vacuum is discussed, other removal devices and machines can perform the same function and fall within the scope of this invention, including those that use magnets, cranes, pry bars, hydraulics, lifts and other separators.

After the second mold parts 805 have been removed from the first mold parts 800, bricks 300 remain partially seated in first mold parts 800. First mold parts 800 and bricks 300 can then be transported by belt 820 to a sixth location or brick-dispensing station 860. Preferably, brick-dispensing station 860 is situated where the conveyor causes the objects carried on it to invert. Then, as tray 822 and first mold parts 800 invert, bricks 300 fall out of first mold parts 800 due to gravity, optionally into a receiving bin 862 or other collection device, or onto a chute, second conveyor, or other conveying structure configured to move the bricks from the casting area to a nearby location. Alternatively, bricks 300 can be removed manually or mechanically. After the bricks 300 have been removed, the first mold parts 800 can travel to additional locations via the belt 820 for removal, repair, cleaning, and further configuring or processing before being reassembled and reattached to trays 822 or conveyor 820 for additional brick casting.

Additional stations can be included in process 815 as needed. For example, process 815 may include dedicated stations for cleaning parts, situating skeletons, delivering additives, collecting parts, applying pre-treatments, further processing, labelling, collecting data, inspecting, or other steps typically found in the manufacturing or casting process. Also, where desirable and possible, multiple independent stations can be combined to improve efficiency, save space, or for other purposes, and conveyor 820 can be replaced by other automatic, manual, or combination thereof means for transferring or transporting items from one place to another including using rollers, indexers, chutes, vehicles, carts, pulleys, hanging carriers, and other assembly line and manufacturing facility equipment.

Preferably, after bricks 300 have been removed from their molds 305, a friction enhancing coating 302 can be applied 155 to the surface of the bricks 300. One or more coatings 302 can be applied as a liquid, sprayed on, or applied using a polymer wrapping technique.

Configuration of Bricks

Each bituminous material brick 300 is configured with little or no similar dimensions on a given surface section such that when a plurality of bricks 300 are collected in a container or placed next to one another surface contact between adjacent bricks 300 is minimized and air, water, or other cooling substances can easily flow around and between the individual bricks 300, which thereby maximizes the efficiency of cooling around the bricks as they are transported from one location to another. Preferably, surface contact between adjacent bricks is limited to less than 5% of their surface area, although greater surface contact is acceptable according to the present invention provided bricks 300 can remain at a temperature below which softening or melting might compromise the integrity of bricks 300. Generally, surface contact should be less than what would cause bricks 300 to fuse or melt together and no longer be individual bricks 300. For example, a brick 300 with irregular sides and edges will minimize surface contact between adjacent bricks 300, and a brick with concave sides and curved edges will further minimize surface contact between adjacent bricks 300. Surface contact between adjacent bricks 300 can be further minimized by including multiple surfaces where no two surfaces have the dimension and also by including along the surfaces and edges additional surface or edge irregularities such as notches, protrusions, points, channels, cavities, or combinations thereof or by configuring the overall shape as an irregular solid not composed of other recognized shapes.

Figure 12:
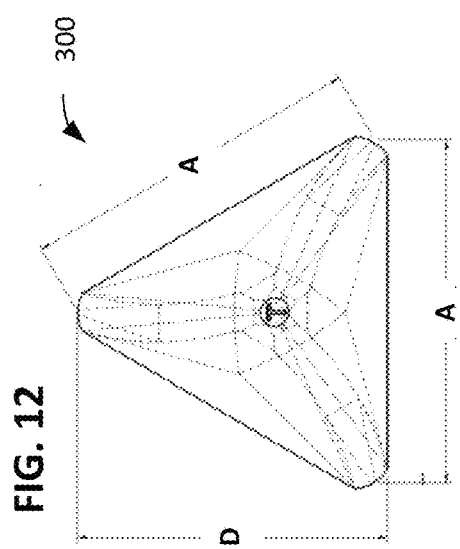
FIG. 12 is a top view of the brick of the present invention marked with its preferred dimensions.
Figure 14:
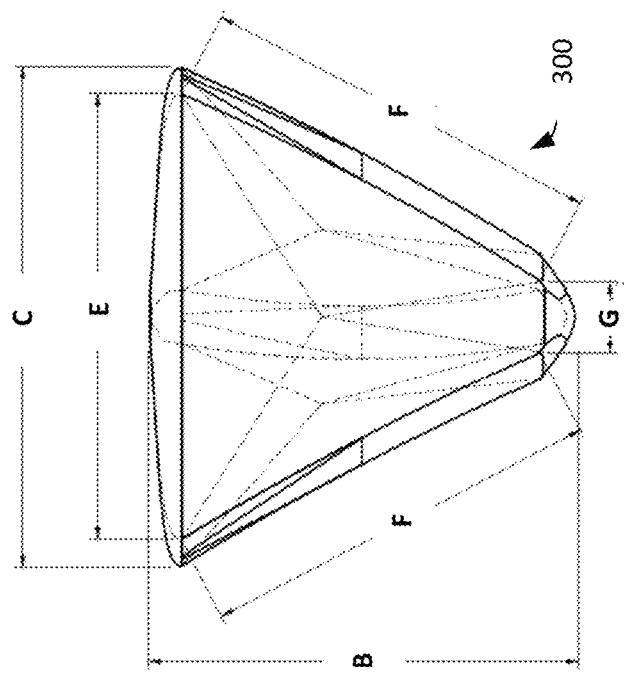
FIG. 14 is a second side view of the brick of the present invention marked with its preferred dimensions.
Figure 13:
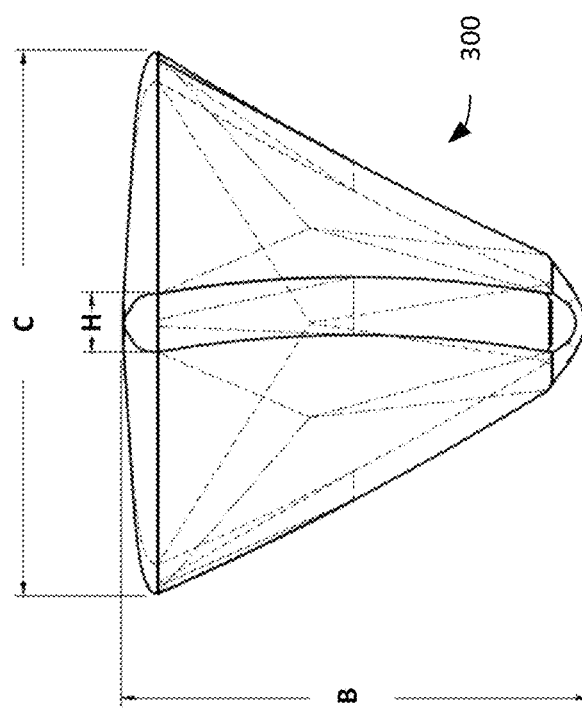
FIG. 13 is a first side view of the brick of the present invention marked with its preferred dimensions.

FIGS. 3A-14 illustrate a brick 300 of the present invention with a preferred shape and size. FIGS. 3A-6B illustrate the preferred overall shape of brick 300, which is similar to a modified tetrahedron having no right angles. FIGS. 7-11 illustrate how the skeleton 400, which is further detailed below, is distributed throughout the brick 300 according to the preferred embodiment of the present invention. FIGS. 12-14 illustrate the dimensions of the brick 300 according to the preferred embodiment of the present invention.

According to the preferred embodiment, brick 300 has a substantially solid body (not labelled) that is defined by an outer surface that includes three non-planar modified triangular face surfaces 330, a modified triangular domed top surface 310, three curved edges 320, and a point opposite top surface 310 where the three face surfaces 330 meet that is a modified domed bottom surface 314, as shown in FIGS. 3A-6B. As used herein, the term "modified" when used to describe shapes, surfaces, and solids refers to shapes, surfaces, and solids that resemble a defined shape, surface, or solid yet also include variations such as truncated corners or areas, curved edges or surfaces, irregularities intentionally or unintentionally formed on the surfaces or edges, or other unconventional shape, solid, or surface properties. Likewise, the term "substantially" as used herein shall be understood to mean essentially, to a great extent, or for the most part. For example, a substantially solid body is a body that is intended to be solid but may contain unintentional imperfections or that is intended to be mostly solid but for features or imperfections, such as air pockets, that are intentionally embedded within it.

As shown in FIGS. 3A-6B, curved edges 320 are located where sides or edges of adjoining face surfaces 330 generally meet. They act as the integral connection between the edges of adjoining face surfaces 330 and can be considered surfaces as well, especially where they have some width H. Each curved edge 320 preferably includes adjacent first, second, and third edge sections 320a, 320b, and 320c near a top end 320h that connects to domed top 310 and a fourth section 320d that makes up the remainder of curved edge 320 and connects at the opposite bottom end 320g of curved edge 320 to domed bottom 314. Curved edges 320 along their longer sides or edges 320e and 320f, which are spaced at a substantially constant distance of H from one another, preferably have a 132 radius. First, second, and third edge sections 320a, 320b, and 320c are each preferably substantially planar. In an alternate embodiment shown in FIG. 3C, curved edges can have dimensions that differ from each other as shown with respect to a first curved edge 320AA having an overall length of F1, a second curved edge 320BB having an overall length of F2, and a third curved edge 320CC having an overall length of F3, which is discussed further with respect to FIGS. 12-14.

Each non-planar modified triangular face surface 330 is preferably further comprised of a first triangular section 332, a second triangular section 334, a third triangular section 336, and a fourth triangular section 338. First triangular section 332 connects to modified domed top 310 along a first edge 332a, to second triangular section 334 along a second edge 332*b*, and to third triangular section 336 along a third edge 332*c*. Second triangular section 334 connects along a first edge 334*a* to one of the adjoining face surfaces 330 via one of curved edges 320, to first triangular section 332 along a second edge 334*b*, and to fourth triangular section 338 along a third edge 334*c*. Third modified triangular section 336 connects along a first edge 336*a* to one of the adjoining face surfaces 330 via another of curved edges 320, to fourth triangular section 338 along a second edge 336*b*, and to first triangular section 332 along a third edge 336*c*. Fourth triangular section 338 connects to domed bottom 314 along a first edge 338*a*, to third triangular section 336 along a second edge 338*b*, and to second triangular section 334 along a third edge 338*c*. All four triangular sections 332, 334, 336, and 338 also meet at a center point 340 of each face 330, and the center point 340 is preferably substantially circular. Additionally, each of the triangular sections 332, 334, 336, and 338 can be substantially triangular in shape or other shapes that cooperate to make an overall triangular face surface 330 as will be understood by those skilled in the art. Preferably third triangular section 336 includes a notch 342 or notch surface positioned where third triangular section 336 connects to domed bottom 314.

Domed bottom surface 314 of brick 300 includes a center domed portion 315 that abuts the fourth triangular sections 338 of the three face surfaces 330 and three edge extensions 316 that abut the bottom ends 320*h* of curved edges 320 where the edge extensions 316 and curved edges 320 meet. The three edge extensions 316 connect and fit within the center domed portion 315 of domed bottom surface 314 to make an overall modified dome-shaped surface having a hexagonal perimeter at its base.

Modified triangular domed top surface 310 includes three truncated triangular top sections 311, three top edge extensions 312, and center point 318. Each of the truncated triangular sections 311 connect at a first edge 311*a* to first triangular section 332 of each face 330, at two second edges 311*b* to top edge extensions 312, and a truncated point 311*c* that connects to center point 318. Top edge extensions 312 connect to the top ends 320*h* of curved edges 320 and to center point 318.

Each of the surfaces of the faces, section, and edges of brick 300 are optionally contoured to further enhance their irregularity. FIGS. 3B, 4B, 5B, and 6B illustrate the outer surface contouring with gray lines. Preferably, with respect to each face 330, first triangular section 332 and fourth triangular section 338 are substantially planar, second triangular section 334 is substantially concave, and third triangular section 336 is substantially convex. Domed top surface 310 and domed bottom surface 314 are generally convex in overall shape but may include some variations in contour where desired. With respect to each curved edge 320, each of its individual sections 320*a*, 320*b*, 320*c*, and 320*c* are substantially planar as described above. Additionally, notch 342 and center points 340 are preferably substantially planar.

Figure 3A:
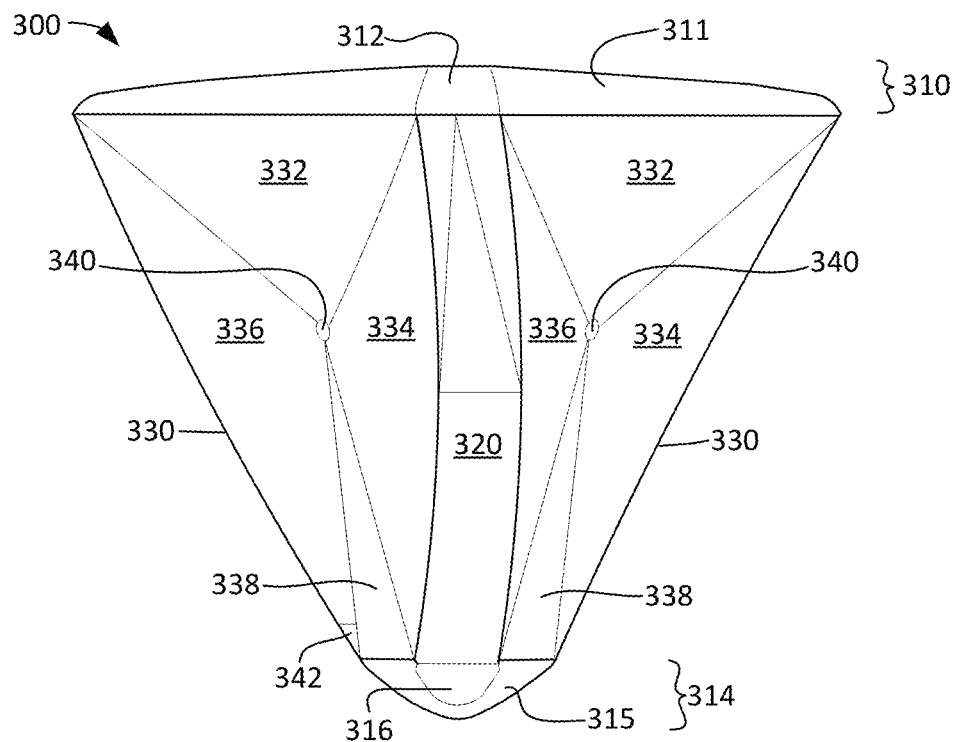
FIG. 3A is a first side view of a brick according to the preferred embodiment of the present invention.
Figure 3B:
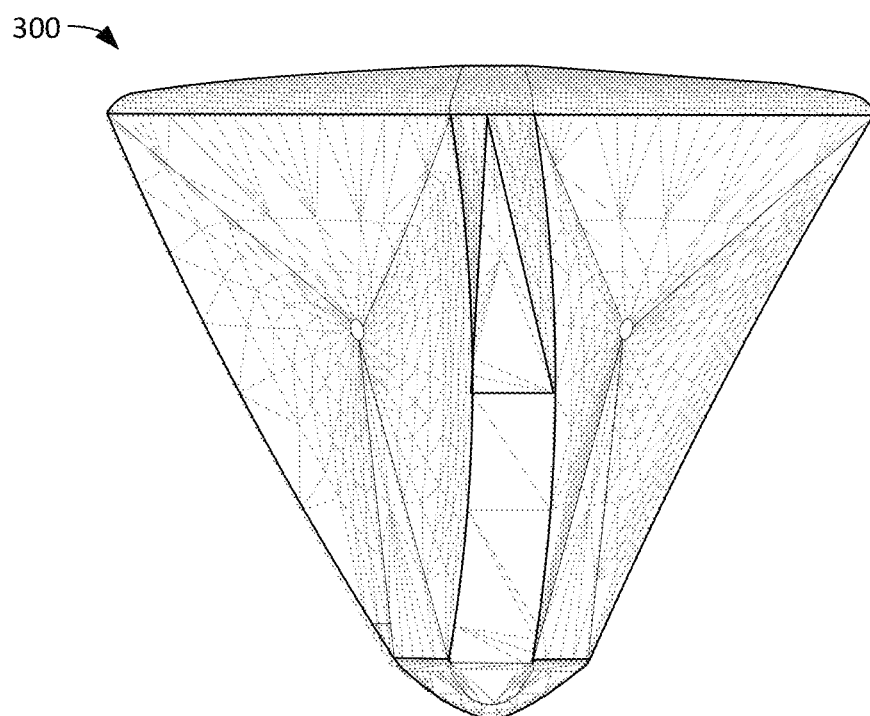
FIG. 3B is a first side view of the brick according to the preferred embodiment of the present invention mapped with contour lines.
Figure 3C:
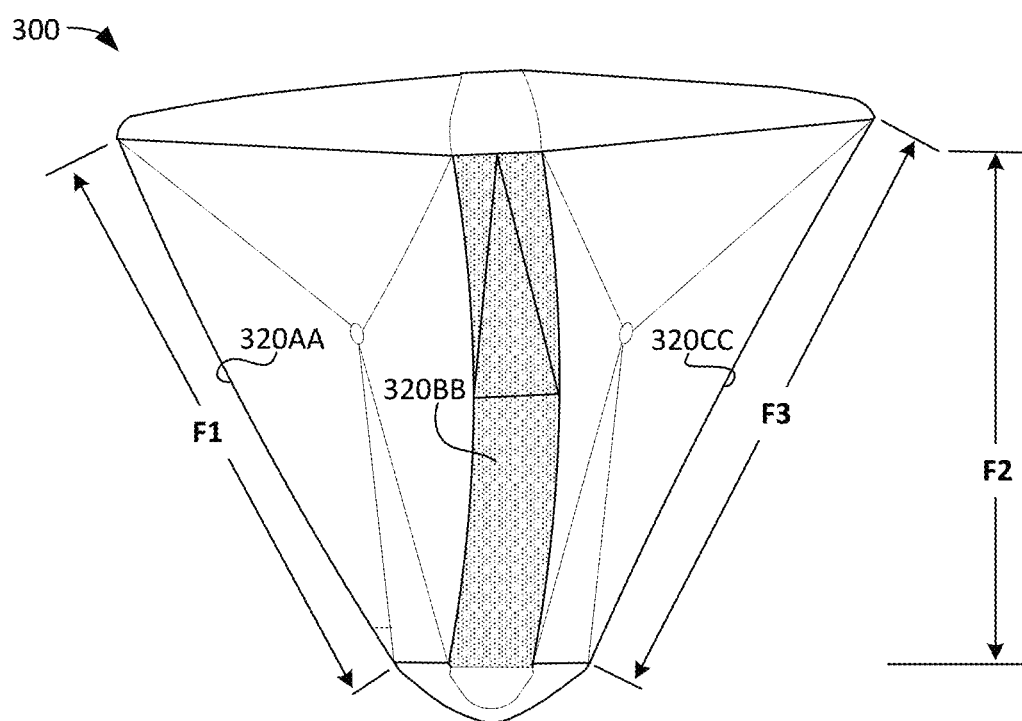
FIG. 3C is a first side view of the brick according to an alternative embodiment of the present invention.
Figure 4A:
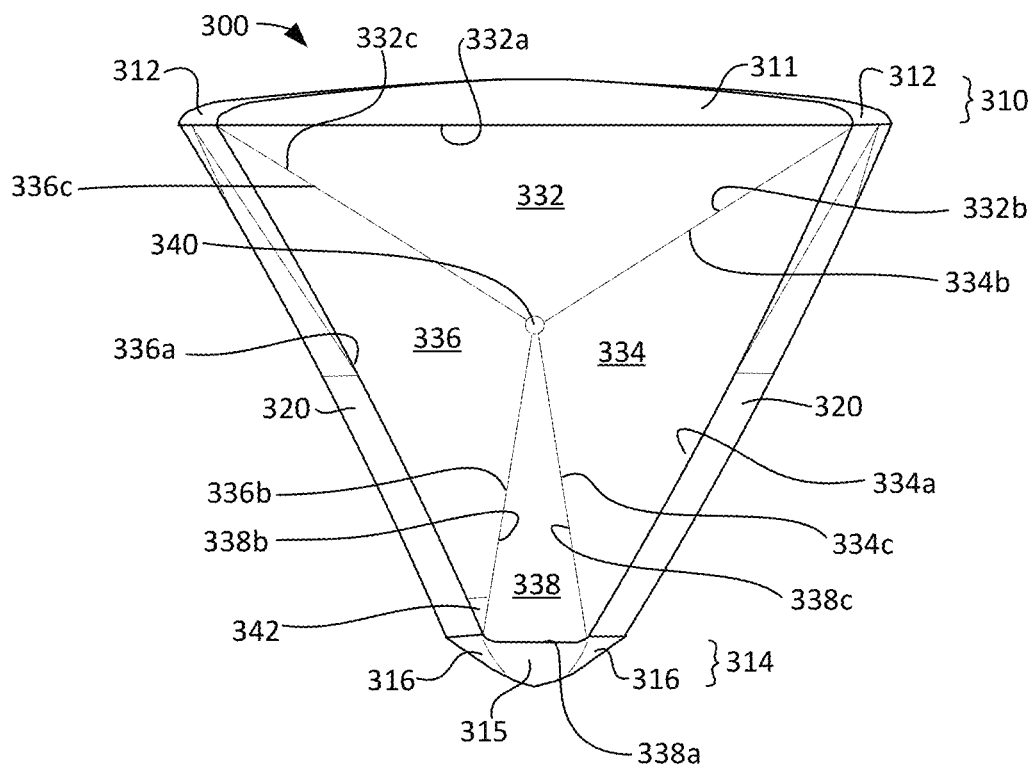
FIG. 4A is a second side view of the brick according to the preferred embodiment of the present invention.
Figure 4B:
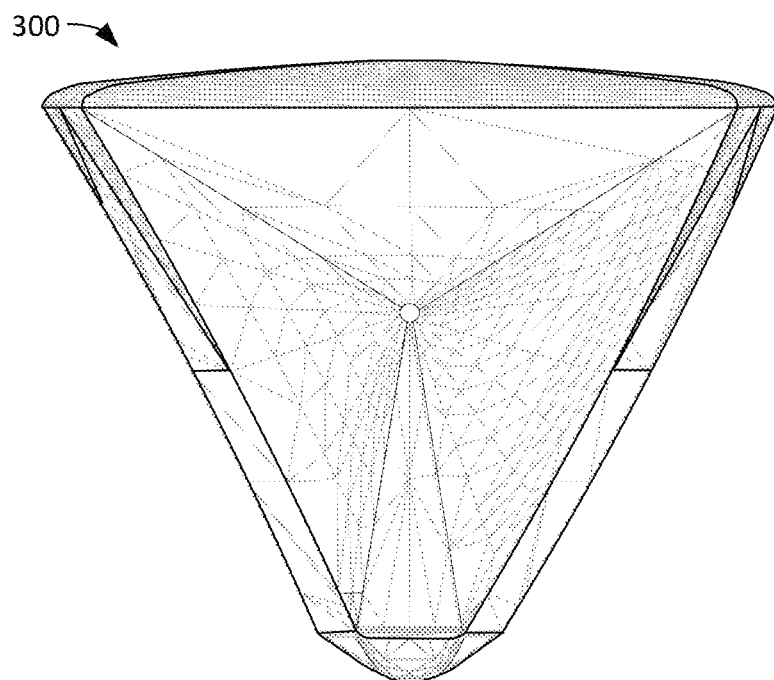
FIG. 4B is a second side view of the brick according to the preferred embodiment of the present invention mapped with contour lines.
Figure 5A:
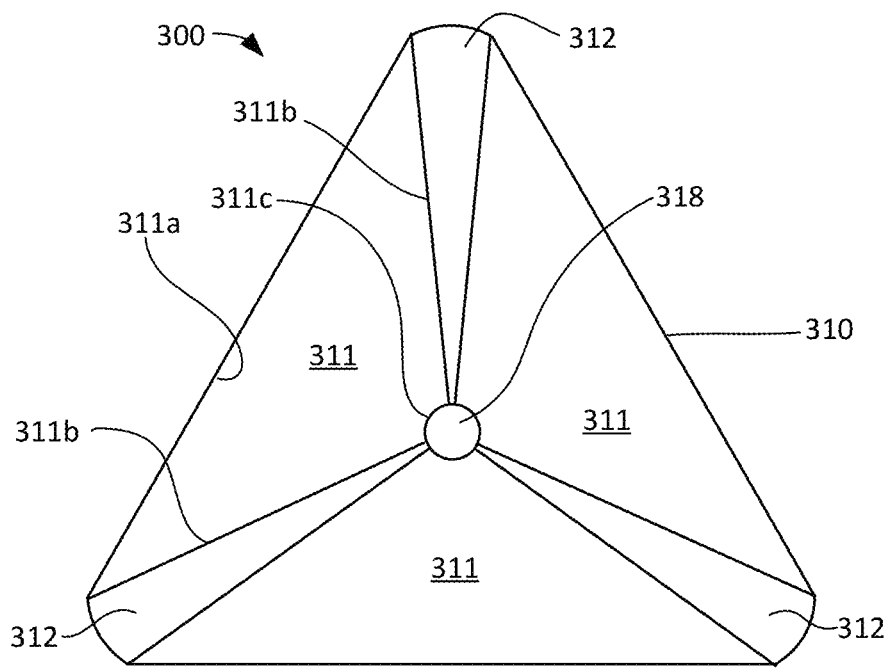
FIG. 5A is a top view of the brick according to the preferred embodiment of the present invention.
Figure 5B:
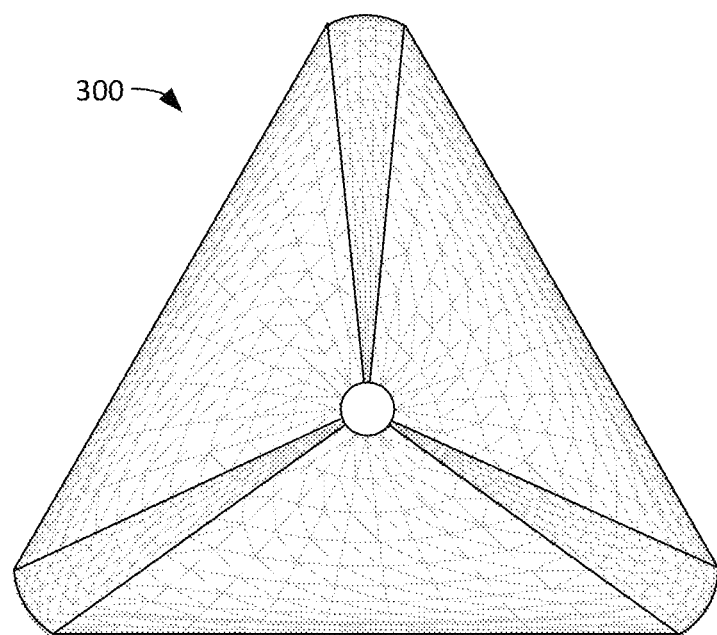
FIG. 5B is a top view of the brick according to the preferred embodiment of the present invention mapped with contour lines.
Figure 6A:
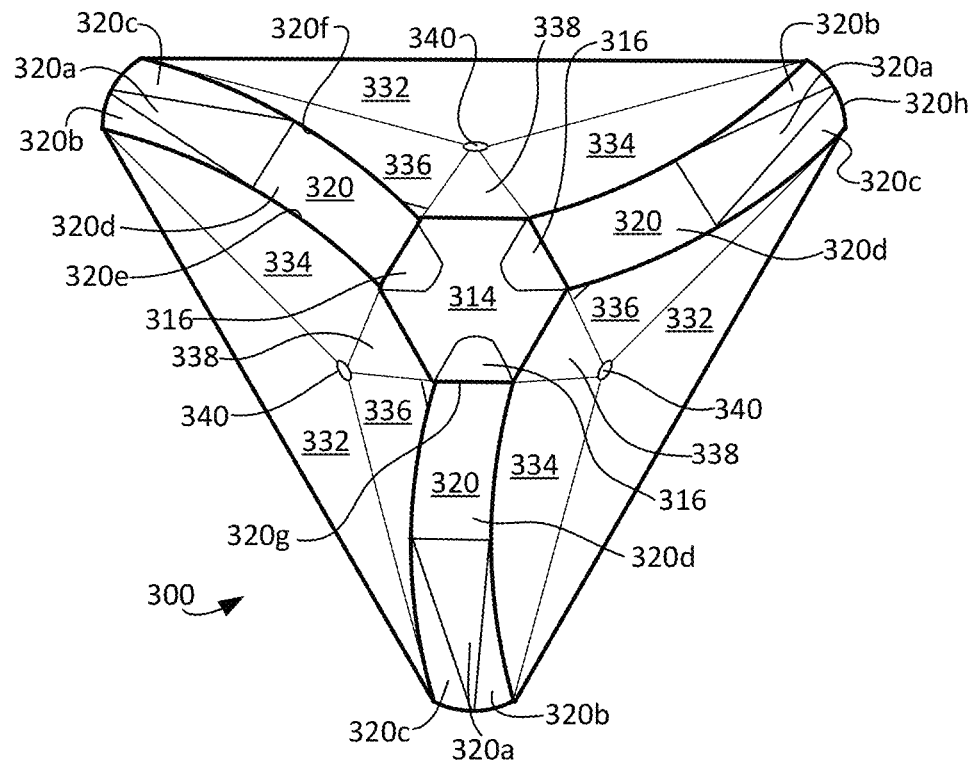
FIG. 6A is a bottom view of the brick according to the preferred embodiment of the present invention.
Figure 6B:
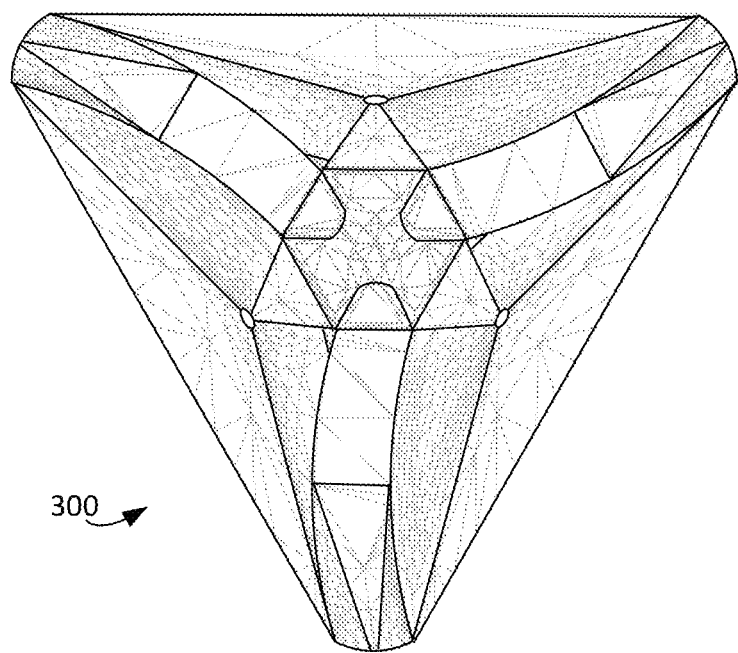
FIG. 6B is a bottom view of the brick according to the preferred embodiment of the present invention mapped with contour lines.
Figure 7:
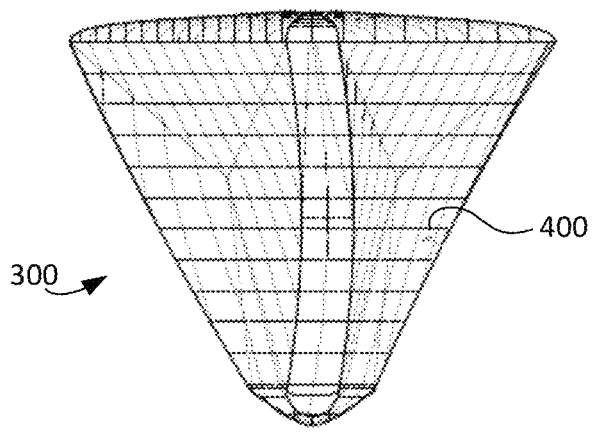
FIG. 7 is a first side view of a brick showing a skeleton distributed throughout the bituminous material according to the preferred embodiment of the present invention.
Figure 8:
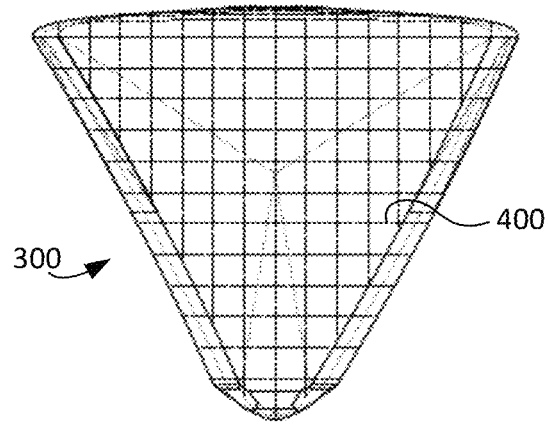
FIG. 8 is a second side view of the brick showing the skeleton distributed throughout the bituminous material according to the preferred embodiment of the present invention.
Figure 9:
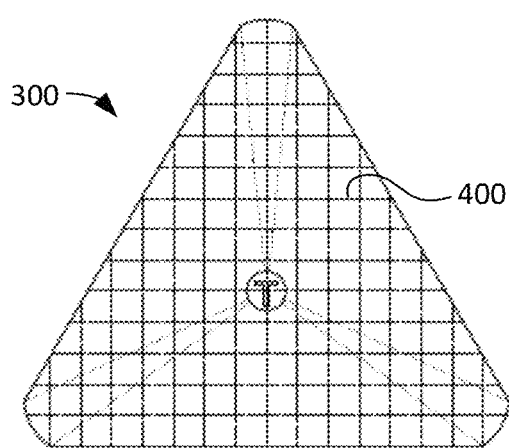
FIG. 9 is a top view of the brick showing the skeleton distributed throughout the bituminous material according to the preferred embodiment of the present invention.
Figure 10:
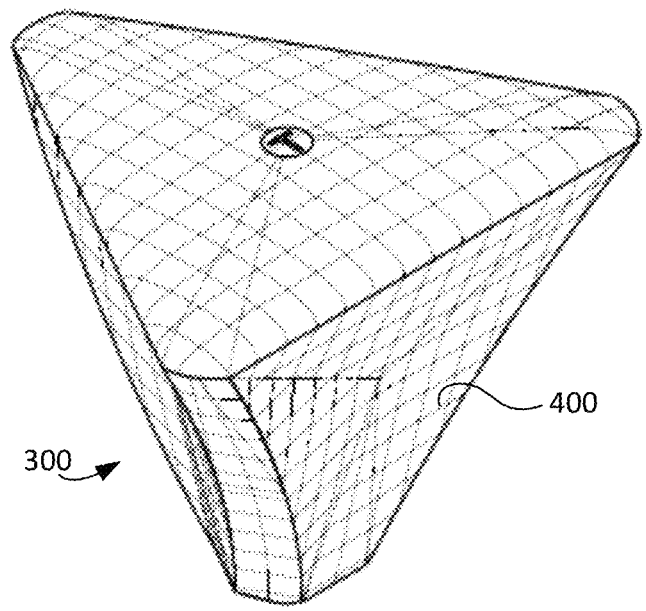
FIG. 10 is a first perspective view of the brick showing the skeleton distributed throughout the bituminous material according to the preferred embodiment of the present invention.
Figure 11:
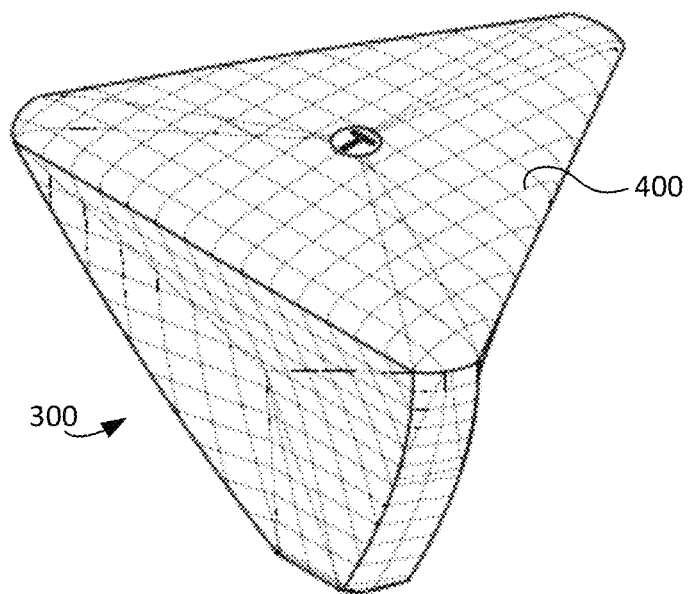
FIG. 11 is a second perspective view of the brick showing the skeleton distributed throughout the bituminous material according to the preferred embodiment of the present invention.

FIGS. 12-14 illustrated preferred dimensions for brick 300. As shown, the width A of each face surface 330 along where its first triangular section 332 connects to the top surface 310 and including the ends of curved edge 320 is about 305 mm, and the distance D from the center of each first edge 332 to the center of each opposing curved edge 320 is about 275 mm. The width E of the top sections 311 of top surface 310 where it connects to the first triangular sections 332 of the face surfaces is about 280 mm and the width C of the top sections 311 and edge extensions 312 on each side of top surface 310 is about 315 mm. The overall distance B from the center of top surface 310 to the center of bottom surface 312 is about 270 mm, and the overall length F of each curved edge 320 is about 253 mm. The width G of each face surface 330 along where its fourth triangular section 338 connects to bottom surface 312 is about 45 mm. The width H of each curved edge 320 is about 35 mm. Where brick 300 has a shape consistent with the alternate brick 300 of FIG. 3C, the overall dimensions will be different. As shown in FIG. 3C, each of the curved edges has a different overall length, where first curved edge 320AA has a length of F1, second curved edge 320BB has a length of F2, and third curved edge 320CC has a length of F3. Because the lengths of curved edges 320AA, 320BB, and 320CC differ, each of the face surfaces 330 will also have dimensions that differ from each other, and the top surface 310 and bottom surface 314 will have further contours. Accordingly, the alternate embodiment of brick 300 will be further irregular and likely to further discourage surface contact with adjacent bricks.

While the Figures generally illustrate a preferred embodiment for the size and shapes of the surfaces, edges, top, and bottom and for the contours of the outer surface of bricks 300, it will be understood by those skilled in the art that changes to the size, shape, and contouring of the irregular solid and its surfaces may be altered as long as the resulting brick 300 minimizes surface contact between adjacent bricks 300. Preferably, the size, shape, and contouring of the irregular solid and its surfaces work to prevent or discourage two or more bricks 300 from interlocking and instead encourage fluid or air flow between and among adjoining bricks 300 as discussed above. Additionally, bricks 300 and their corresponding molds 305 as shown and discussed herein can be scaled larger or smaller depending on industry needs as is understood by those skilled in the art.

Polymer Skeleton

In the preferred embodiment of bricks 300, each brick 300 is enhanced with a polymer or other buoyant additive that can be scaled and customized according to a customer's needs. In addition to optionally including a polymer or other additive blended into the bituminous material 105, each brick 300 is preferably also configured with a rigid, semi-rigid, or flexible skeleton 400 to further increase its buoyancy in salt and fresh waters. More preferably, the components of skeleton 400 are distributed throughout each brick 300 in a manner such that they increase the buoyance of each brick 300 both when it is fully intact and should it break into smaller pieces. As used herein, the term "skeleton" includes all three-dimensional configurations of materials and components arranged in a pattern or predetermined manner including, for example, matrices, frameworks, networks, structures, grids, layers, lattices, architectures, scaffolding, cages, fabric, schemes, tessellations, arrangements, and combinations thereof. Further, within each brick 300, skeleton 400 can be made up of solid, semi-solid, or hollow components, rigid, semi-rigid, or flexible components, and integrated or cooperating components including, for example, the following: a hollow structure filled with air, buoyant gas, or liquid; a substantially solid structure encapsulating a plurality of air pockets, bubbles, nanobubbles, or other buoyancy-increasing matter; a structure of porous material impregnated with a complimentary buoyant material; and a matrix, framework, network, lattice, or grid of fibers or solid materials formed with or arranged to hold secondary buoyancy-increasing features including chambers, compartments, pockets, capsules, bubbles, nanobubbles, and combinations thereof.

Figure 16:
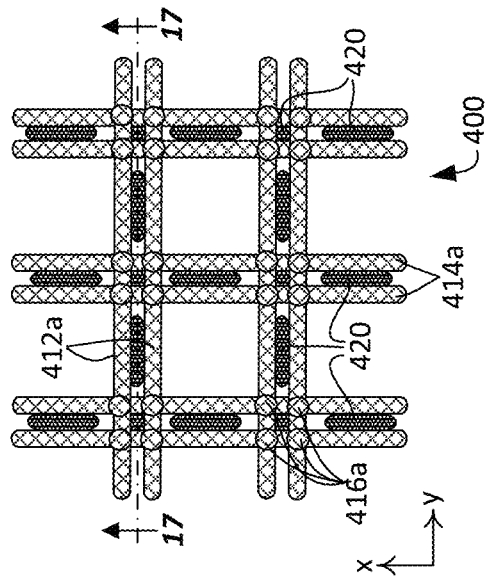
FIG. 16 is a top view of the skeleton shown in FIG. 15.
Figure 15:
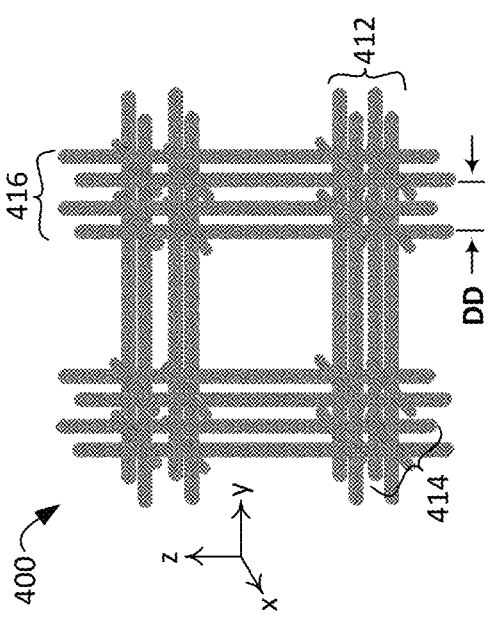
FIG. 15 is a perspective view of a skeleton formed from fiber groups according to an embodiment of the present invention.
Figure 17:
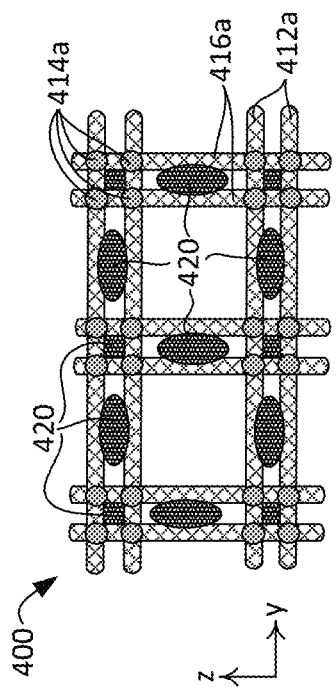
FIG. 17 is a cutaway side view of the skeleton of FIG. 16 cut along the line marked 17-17.

FIGS. 7-11 illustrate a preferred embodiment of skeleton 400 according to the present invention, which is a polymer skeleton 400 that is further substantially uniformly distributed throughout the body of each brick 300. FIGS. 15-17 illustrate an embodiment of polymer skeleton 400, which preferably includes a lattice, frame, or grid arrangement of fibers made from a polymer or plastic material commonly used to enhance heavy crude oil, extra heavy crude oil, bitumen, and asphalt. For example, skeleton 400 can be formed from plastomers such as polyethylene, polypropylene, ethylene-vinyl acetate, and ethylene-butyl acrylate or thermoplastic elastomers such as styrene-butadiene-styrene, styrene-isoprene-styrene, and styrene-ethylene/butylene-styrene. Preferably, skeleton 400 is formed from waste or recycled plastics. Also as shown in FIGS. 15-17, skeleton 400 optionally and preferably further includes a plurality of buoyant features 420 encapsulating air or other buoyant material.

In the preferred embodiment of skeleton 400, polymer fibers are arranged in linear fiber groups that are further arranged in a framework such as a three-dimensional grid or lattice formation. More preferably, the fiber groups are positioned parallel to some fiber groups and at right angles with respect to other fiber groups. As shown in FIG. 15, a plurality of first fiber groups 412 extends along the y-axis, a plurality of second fiber groups 414 extends along the x-axis, and a plurality of third fiber groups 416 extends along the z-axis. First fiber groups 412 extend substantially parallel with other first fiber groups 412 and at a right angle with respect to second and third fiber groups 414 and 416. Second fiber groups 414 extend substantially parallel with other second fiber groups 414 and at a right angle with respect to first and third fiber groups 412 and 416. Third fiber groups 416 extend substantially parallel with other third fiber groups 416 and at a right angle with respect to first and second fiber groups 412 and 414. Additionally, each of fiber groups 412, 414, and 416 preferably has four or more individual fibers 412a, 414a, and 416a optionally positioned substantially parallel to and spaced apart from one other at a fixed distance. For example, fibers within each group extend substantially parallel to one another at a distance DD, and further arranged such that a cross section of the fiber groups would be square in shape. Alternatively, fibers in the groups can be arranged to have cross-sections of other shapes such as circular, rectangular, hexagonal, or triangular, and fiber groups can have fibers that are arranged substantially parallel, twisted together, converging, diverging, crossed, or in any other grouped arrangement as desired.

Optionally and preferably, attached to, connected to, hanging from, or positioned among the fibers 412a, 414a, and 416a of each of the pluralities of fiber groups 412, 414, and 416, a plurality of buoyant features 420 can be formed or held to increase the buoyancy of the bricks 300 by increasing, for example, air entrainment throughout each brick 300. Alternatively, buoyant features 420 can replace skeleton 400 such as when buoyant features 420 are gaseous injections. Buoyant features 420 can be individual or groups of pockets, bubbles, nanobubbles of air or other buoyancy-increasing gases such as nitrogen or liquids that are formed into or on the fibers 412a, 414a, and 416a or held by the fibers 412a, 414a, and 416a in discreet capsules, chambers, or other compartments or any combination of such elements. For example, in FIGS. 15-17, buoyant features 420 are illustrated as a plurality of capsules of air where the material encapsulating the air is the same material as used for the fibers 412a, 414a, and 416a. The size of individual buoyant features 420 influences the buoyancy of the bricks 300 and can be adjusted according to specifications required by shippers, customers, or other interested parties. Additionally, the locations of buoyant features 420 can be controlled prior to casting the bricks 300 so that, for example, buoyant features 420 are cast into the bricks 300 evenly. In some cases, buoyant features 420 can be intentional voids introduced to bricks 300 where no skeleton 400 is present or in addition to using a skeleton 400. For example, during casting, the manufacturer can inject gases such as air, steam, oxygen, and inert gases to produce produces bubbles or using other air entrainment or aeration methods to trap create bubbles or voids that increase buoyancy. Whether used in cooperation with skeleton 400 or independently, buoyant features 420 can be any feature that is added to bricks 300, preferably intentionally and uniformly applied, to increase buoyancy. Incorporating buoyant features 420 throughout skeleton 400 and consequently throughout bricks 300 increases the likelihood that bricks 300 will float in the event they are released into oceans, lakes, or rivers. Moreover, bricks 300 will float even if they are broken or otherwise damaged.

The components of skeleton 400, including the fiber groups 412, 414, and 416 and buoyant features 420, are preferably configured to fit within the molds 305 and formed by injection molding. The density of skeletons 400 can be adjusted as well, and for the embodiment shown in FIGS. 15-17, the overall size of the individual fibers 412a, 414a, and 416a that make up the fiber groups 412, 414, and 416, the number of groups of fibers 412, 414, and 416, and the number of fibers within each fiber group 412, 414, and 416 can be adjusted as needed to create bricks 300 having a specified polymer content. For example, bricks 300 having 4% polymer by weight will be made with skeletons 400 having larger fibers than bricks 300 having 2% polymer by weight. Preferably, for each brick 300 of heavy crude oil, the amount of polymer by weight should be between 1% and 4% to create buoyancy. Also preferably, for each brick 300 of bituminous material, the amount of polymer by weight may be as high as 10% in warmer climates or 7% in colder climates to further enhance its performance.

Once skeletons 400 are formed, they are positioned within molds 305 so that suitably viscous bituminous material 205 can fill the space not occupied by skeletons 400. For example, with respect to the embodiment shown in FIGS. 15-17, suitably viscous bituminous material 205 can fill the spaces around and among the fiber groups 412, 414, and 416 and buoyant features 420 during the casting process. Once the bituminous material 105 and molds 305 cool, each resulting brick 300 includes a skeleton 400 embedded within it.

Transport of Bricks

Because bricks 300 have an irregular shape that allows air, water, or other substances to circulate among them and because bricks 300 can float on, at, or near the surface of salt and fresh waters, they can be transported in bulk as solids by most or all vehicles that carry cargo or freight, including truck, rail, air, and marine methods. Transporting bituminous material in sold form eliminates the need to heat bituminous material 105 during transport, which in turn substantially reduces or eliminates greenhouse gas emissions. Moreover, bricks 300 can be transported on hydrogen-powered vehicles thereby further reducing or eliminating carbon dioxide emissions.

Figure 18A:
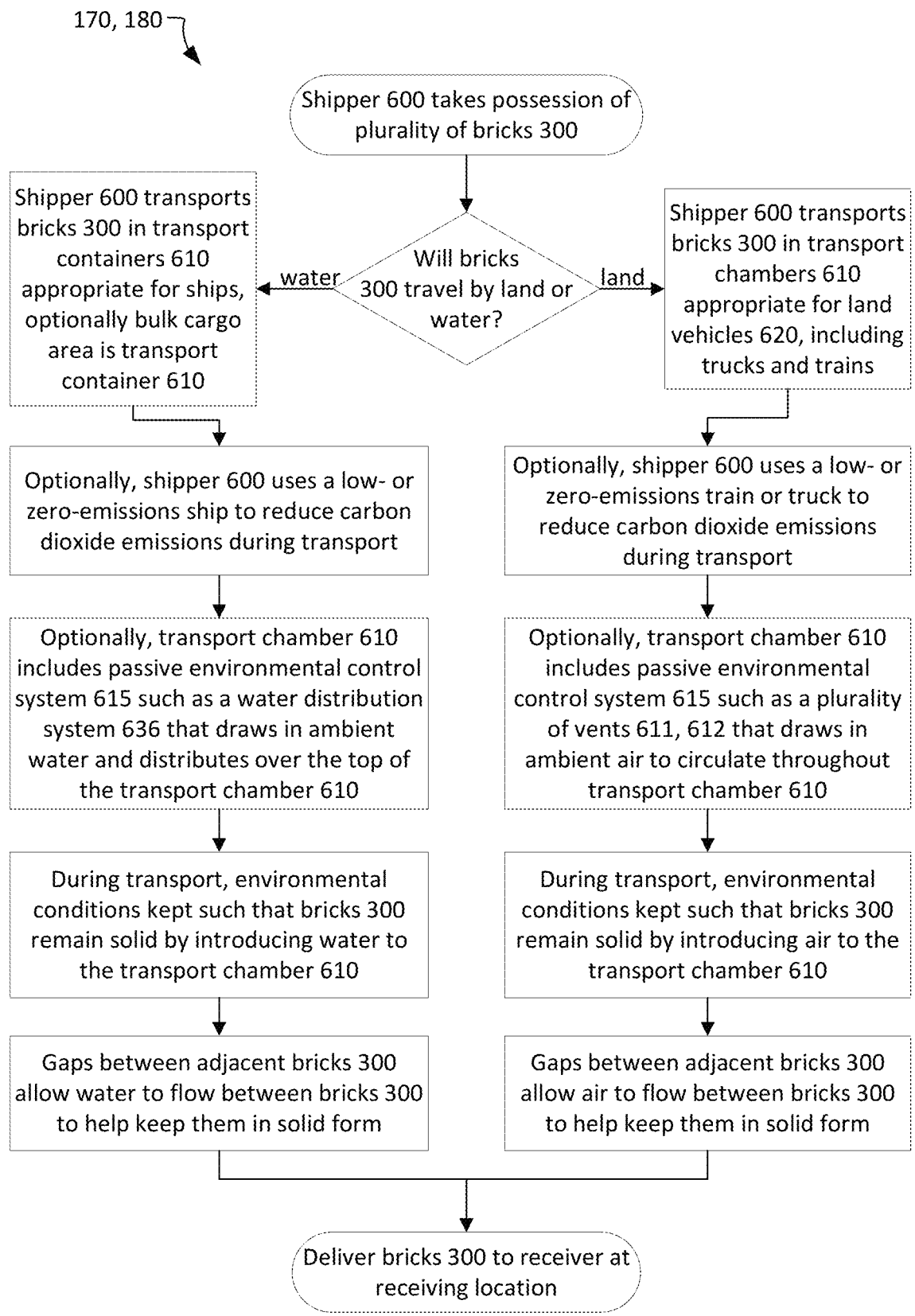
FIG. 18A is a flowchart illustrating land and marine methods of transporting the bricks according to a preferred embodiment of the present invention.
Figure 18B:
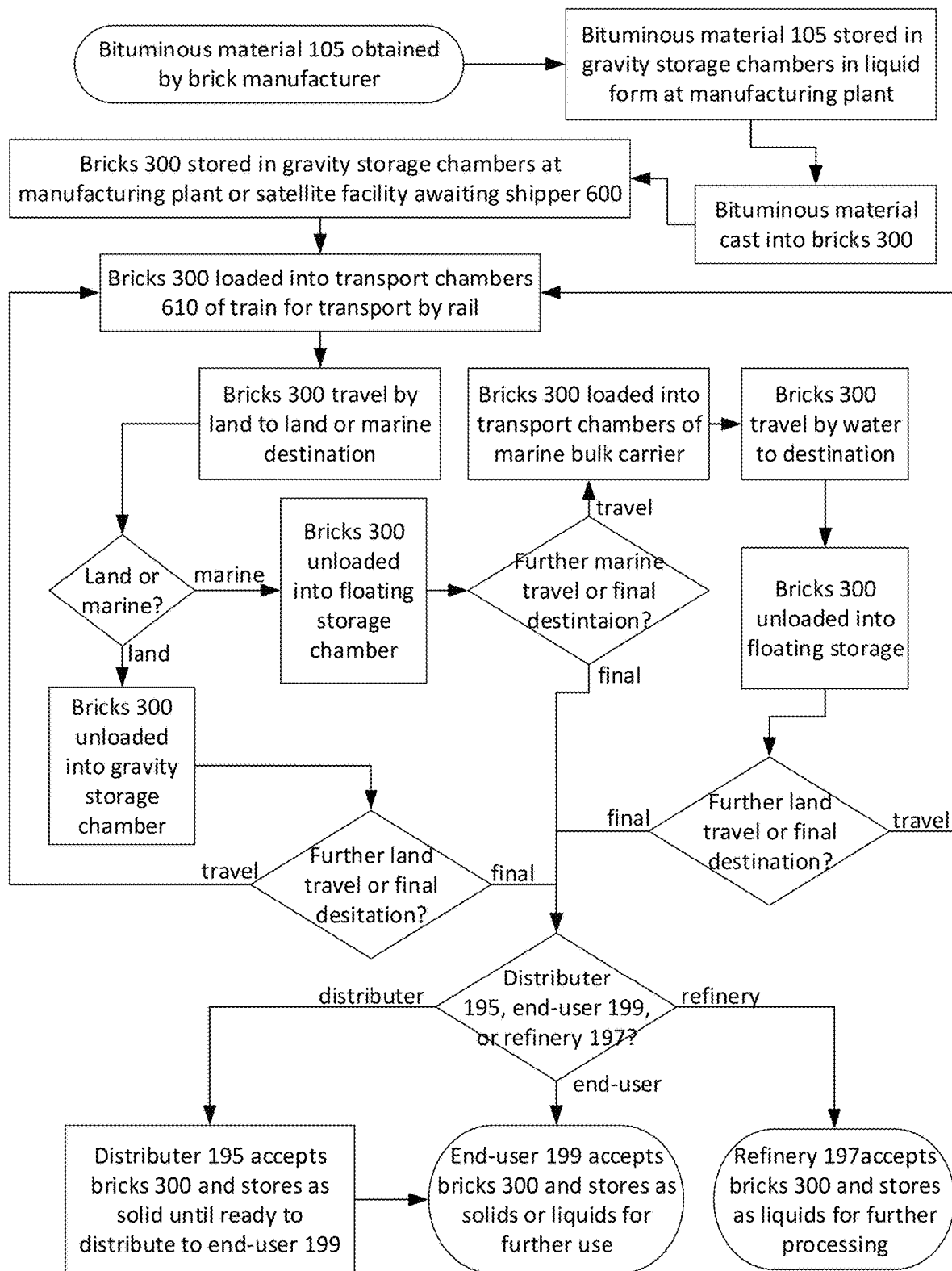
FIG. 18B is a flowchart illustrating shipping routes according to a preferred embodiment of the present invention.

FIGS. 18A and 18B illustrate alternate methods of transporting, storing, and receiving bricks 300 according to preferred methods of the present invention. After a desired number of bricks 300 are cast and collected, a shipper 600 can take possession of the plurality of bricks 300, which may have been stored at the manufacturer in gravity storage chambers 908, for example. Shipper 600 then transports 170 the plurality of bricks 300 in a transport chamber 610 to a receiving location 905 by vehicle 620. As defined and discussed above, vehicles 620 includes both piloted and driverless vehicles, and transport chamber 610 can be a specialty container associated or integral with a dedicated brick-hauling vehicle. As used herein, the terms "chamber" and "chambers" refer to structures that can hold goods, including containers, compartments, bins, modules, vessels, cartons, packages, boxes, and other types of receptacles. Chambers for transport are further capable of being transported from one location to another.

Figure 19A:
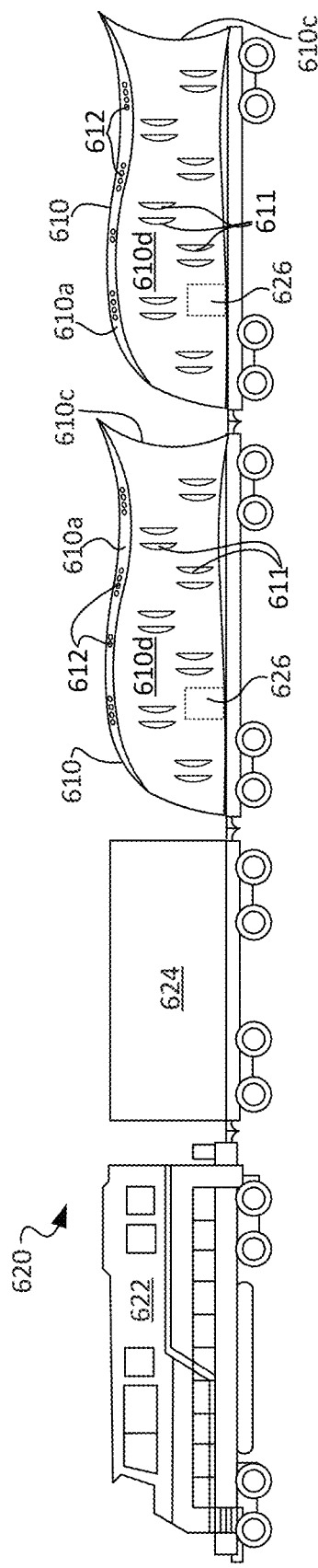
FIG. 19A is an illustration of a low-emissions rail transportation system and dedicated aerodynamic transport chamber according to a preferred embodiment of the present invention.
Figure 19C:
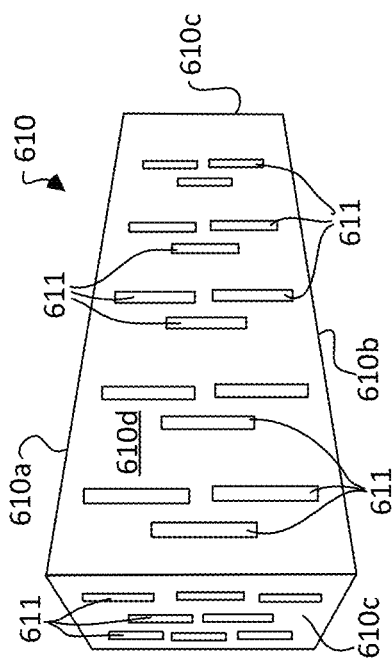
FIG. 19c is a perspective view of a transport chamber with vents according to a third embodiment of the present invention.

If the plurality of bricks 300 are to travel by land, then the bricks 300 preferably travel in transport chambers 610 on trains or trucks although alternate land transportation methods can be substituted including multimodal and intermodal shipping. Preferably, transport chambers 610 are dedicated aerodynamic transport chambers on trains as described below and shown in FIG. 19A. Transport chambers 610 that are intended for land travel preferably allow ambient air to freely circulate within them, are temperature- or climate-controlled, or otherwise have an environmental control system 615 for introducing ambient or cooled air, so that air can circulate around bricks 300 due to their irregular shapes. As air circulates through the spaces created between adjacent bricks 300 in containers 610, it helps bricks 300 remain substantially solid in form. Alternatively, transport chambers 610 intended for land travel can be configured to use water or other liquid or gaseous substances to control the environment instead of air. To facilitate controlling the environment with ambient air, transport chambers 610 can be configured with or define a plurality of openings or vents 611, 612, as shown in FIGS. 19A and 19C, that are shaped and positioned preferably on the side walls 610d and optionally on the roof 610a, floor 610b, and ends 610c, of the chamber. Vents 611, 612 can act as inlets and outlets and may include, or cooperate with, registers, air dams, flap actuators, fans, wings, flanges, blades, and other static or dynamic components that facilitate or control the amount and direction of air or other substances being drawn into or circulating within the transport chambers 610. Vents 611, 612 can let air both enter and exit transport chambers 610 depending on the direction of travel and additional features can be included to promote continuous or intermittent air circulation.

FIG. 19C illustrates a preferred embodiment of a rail transportation system that can reduce or eliminate carbon dioxide emissions during transit. With this embodiment, the vehicle 620 for transporting the plurality of bricks 300 is a specialized train that includes an engine 622 that is powered by one or more hydrogen fuel cells 624 and a plurality of specialized transport chambers 610 that are preferably aerodynamically shaped and optionally made from aluminum. The transport chambers 610, which connect in series with and stretch behind the engine 622 and fuel cells 624, also preferably include multiple openings or vents 611, 612 on their sides 610d, roofs 610a and ends 610c. Additionally, active environmental control systems 626 such as air conditioners or other refrigeration means are situated within each transport chamber 610 610 should the outside environment ever reach conditions that could compromise or partially melt bricks 300. To further reduce or eliminate harmful emissions, optionally, the active environmental control systems 626 can also be powered by one of the fuel cells 624. As emerging vehicles adopt fuel cell technology, trucks, ships, and other haulers can be configured similarly to reduce or eliminate emissions optionally also with similar fuel cell powered back-up cooling sources.

Figure 19B:
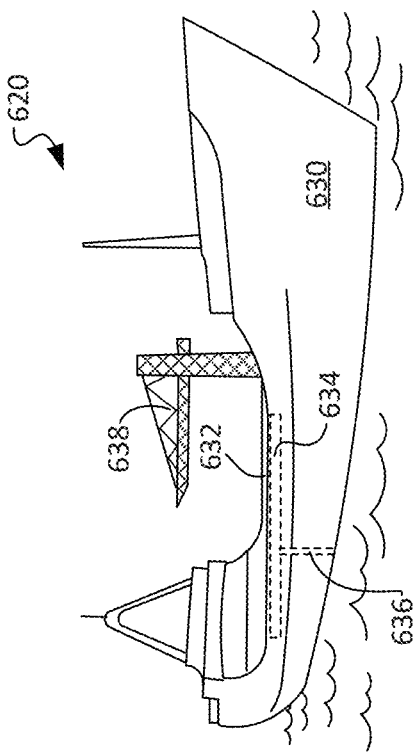
FIG. 19B is a perspective view of a bulk carrier with a cargo area transport chamber according to a second embodiment of the present invention.

If the plurality of bricks 300 are to travel by water, then bricks 300 preferably travel on vehicles 620 such as ships, barges, or bulk carriers 630 having large cargo spaces 632 capable of holding a plurality of bricks 300 as shown in FIG. 19B. Alternatively, bricks 300 can be placed in individual, moveable, or modular transport chambers 610 on ships or barges or alternate marine transportation methods can be substituted including multimodal and intermodal shipping. Where individual, moveable, or modular transport chambers 610 are used for marine travel, preferably they each allow for air, water, or other substances to circulate within them in the same manner as transport chambers 610 used on land do. Where a bulk carrier 630 holds the bricks in its cargo area 632 such that the cargo area 623 becomes the transport chamber 610, the bricks fill the cargo area 632 such that they continue to have adequate space between adjacent bricks to allow air, water, and other substances to circulate. In the preferred embodiment, to maintain the integrity of the bricks, the bulk carrier 630 preferably includes an environmental control system 615 that uses water. It can get water from a dedicated a water source (not shown) or using a water intake 636 that can draw in ambient water such as that from the sea. The water source or water intake 636 also preferably cooperates with a water distribution system 634 such as high-pressure sprinkler systems used to rapidly clean the cargo area of ships. To distribute water over the bricks, whether in individual, moveably, or modular transport chambers 610 or directly contained in the cargo area as a single transport chamber 610, the water distribution system 634 can receive water from the water source or draw water through the intake 636 and spray, sprinkle, or otherwise distribute it over the top of the cargo area and any transport chambers 610. The water can then freely fall around and among the bricks 300 before exiting through drainage holes (not shown) near the base of the cargo area. For reducing or elimination carbon dioxide emissions during transport, bricks 300 preferably travel on ships or carriers powered by hydrogen fuel cells.

Whether traveling by land, sea, or air, transport chambers 610 preferably include passive environmental control systems such as structural features that encourage air, water, or other substances to flow through their interior space as described above. Alternatively, transport chambers 610 may include other systems for environmental control such as forced air, cooling blocks, refrigeration systems, insulation, cold plates, dry ice, cold packs, quilts, bottom air delivery units, reflective paint, and other known active and passive environmental control features or systems. As air, water, or another substance circulates through transport chambers 610, it also circulates through and among the spaces between adjacent bricks 300 collected within the transport chambers 610. As a result, the bricks 300 are able to maintain their irregular solid form.

Receiving Bricks

Those receiving shipments of bricks 300 include intermediaries 185, distributors 195, end-users 199, and refineries 197. End-users 199 might store bricks 300 until needed, distributors might store bricks temporarily before passing on to end-users 199, and refineries 197 might reliquefy the bituminous material 105, further process it, and then return it to solid form to transport to an end-user 199 or distributor 195. Accordingly, those receiving bricks 300 may store the bricks 300 as solids or need facilities or structures in place to reliquefy the bituminous material 105. Typically, if the bricks 300 are made of asphalt or polymer modified asphalt, they will be stored by end-users 199 and used in their brick form. If the bricks 300 are made of bitumen or polymer modified bitumen, they will be reliquefied by refineries 197 for further processing.

According to the present invention, once a transport chamber 610 and plurality of bricks 300 reach the receiving location 905 for an end-user 199, refinery 197, distributor 195, or other intended recipient, the bricks 300 can be stored or prepared for use. If the plurality of bricks 300 are to be stored, they can be left in transport chambers 610 or transferred to other chambers, containers, or storage facilities and optionally can continue to be kept as bricks 300 using active or passive environmental control systems including those that circulate air, water, or other temperature- and climate-influencing substances. For example, bricks 300 traveling by sea to a receiving location 905 having adequate harbor facilities, can be kept partially or entirely submerged in large floating storage chambers 909. Such floating storage chambers 909 may be doubled hulled and can be equipped to allow ambient water to flow through the floating storage chambers 909, to flow between the hulls, or to drip down into the chambers to help maintain the integrity of the bricks 300 while they are being stored. Likewise, bricks traveling by rail or truck to a receiving location 905 on land can be kept in gravity storage chambers 908 that similarly may be doubled hulled and optionally further configured to allow ambient air or water to circulate among the bricks 300 to keep them cool. Storage chambers 908 may be further partially or entirely buried in the ground to further control their environment. Floating storage chamber 909 and other storage chambers 908 can be modified in the same manner as transport chambers 610 with vents 611, 612 and their related features as discussed above to facilitate air, water, or other substances entering and flowing therethrough. Additionally, such storage chambers 908, 909 may include smaller chambers or modules within them or be part of a series of cooperative chambers or modules.

If bricks 300 are to be immediately used or are better stored or prepared for use by melting or heating them to a liquid state or their original state, then they can be melted upon arrival at the receiving location 905. Once bricks 300 reach the receiving location 905, they are heated 190 using methods known to those skilled in the art until they melt, return to a liquid state, or their original state. Bricks 300 also can be introduced to a specialized storage chambers having removable lids equipped with heating elements such as the floating storage chamber 910 shown in FIGS. 20A and 20B or a similarly configured one located on land.

Figure 20A:
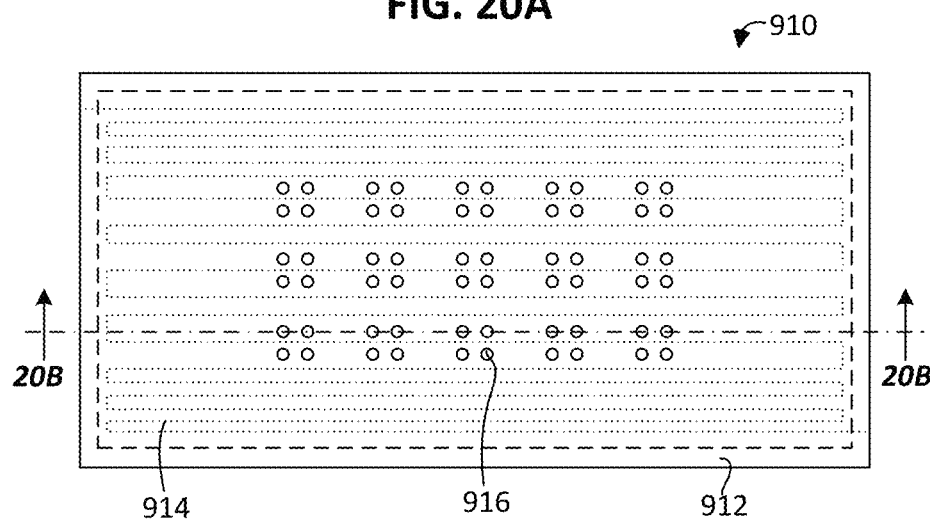
FIG. 20A is a top view of a specialized storage chamber for receiving the bricks according to the preferred embodiment of the present invention.
Figure 20B:
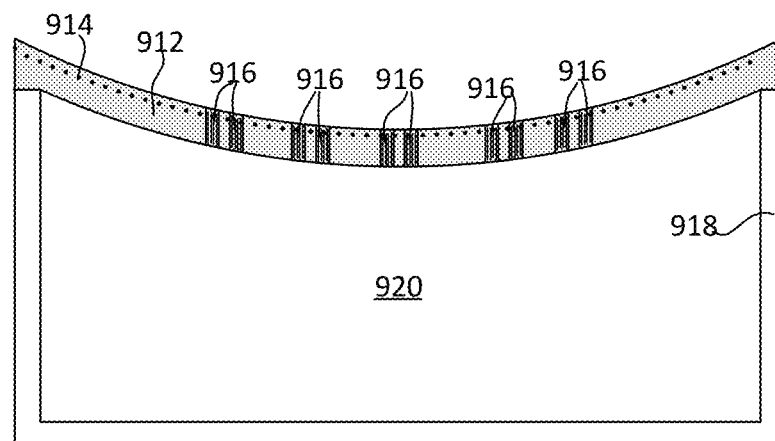
FIG. 20B is a cutaway side view of the specialized storage chamber of FIG. 20A cut along the line marked 20B-20B.

FIGS. 20A and 20B illustrate a specialized storage chamber 910 having a heat-imparting receiving lid 912 configured to accept bricks 300 and immediately melt or soften them with a heating system 914 embedded in lid 912, a housing or chamber body 918, a receptacle or cavity 920 defined by the chamber body 918, and a delivery system 916 that encourages liquids or suitably viscous material to move from the upper surface 912a of lid 912 to the cavity 920 below. Specialized storage chamber 910 can receive bricks 300 from any shipper 600 and vehicle and is particular useful for receiving bricks 300 from a bulk carrier. Using an excavator, bulldozer, crane 638, or other unloading or self-unloading system, as will be understood by those skilled in the art, the bricks can easily be transferred from the cargo area 632 of the carrier 630 onto the receiving lid 912.

Specialized storage chamber 910 can be made of any material suitable for holding both viscous or liquid bituminous material 205 and solid bricks 300 and can be further enhanced with insulation, a lining, or other enhancements. It also may be double hulled and may have several sub-containers positioned within it. For example, container 910 can be formed of concrete, and the cavity walls coated or lined with a non-stick material. Lid 912 can be made of one or more materials depending on the heating element used and as needed to increase its conductive properties. For example, lid 912 can be made of concrete enhanced with nanocarbon black, graphite, or other fillers or coatings that increase its conductivity. Lid 912 is preferably removable so that the chamber body 918 can be used separately as a storage chamber 908 for solid bricks 300. Accordingly, specialized storage chamber 910 has dual purposes, serving as both an environmentally controlled storage chamber for holding bricks 300 and helping maintain their solid form and as a heat-imparting storage chamber that can receive bricks 300, melt or soften them, and keep them in a liquid or suitably viscous form while stored therein.

Figure 20C:
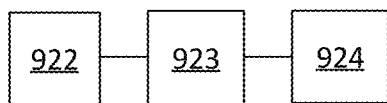
FIG. 20C is a schematic diagram of the elements of the preferred embodiment of a radiant heating system for the specialized storage chamber of FIG. 20A.
Figure 20D:
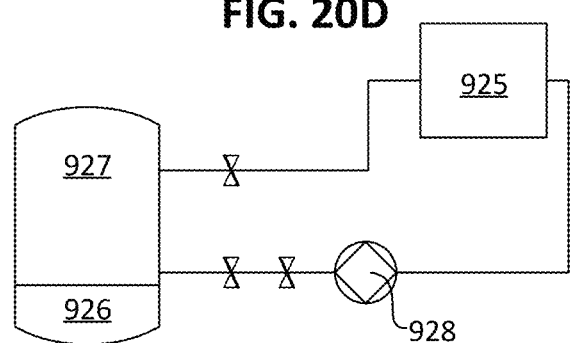
FIG. 20D is a schematic diagram of the elements of a second embodiment of a radiant heating system for the specialized storage chamber of FIG. 20A.
Figure 21A:
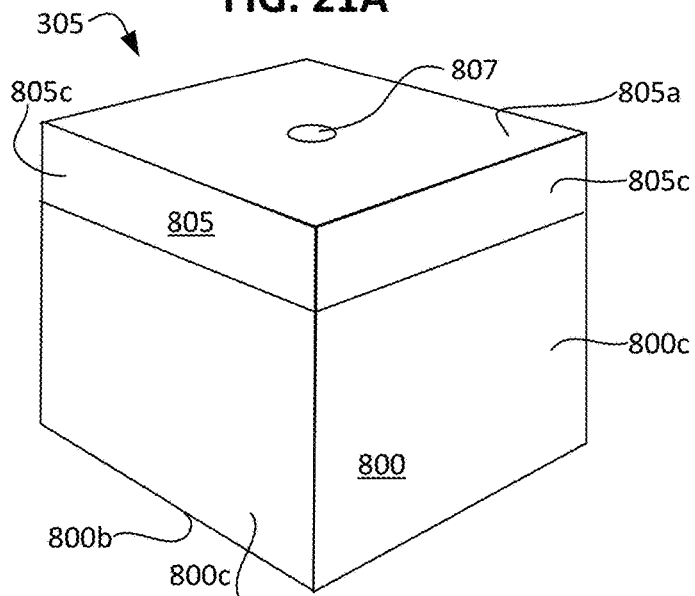
FIG. 21A is a perspective view of an exemplary mold useful for preparing the bricks according to a preferred embodiment of the present invention.
Figure 21B:
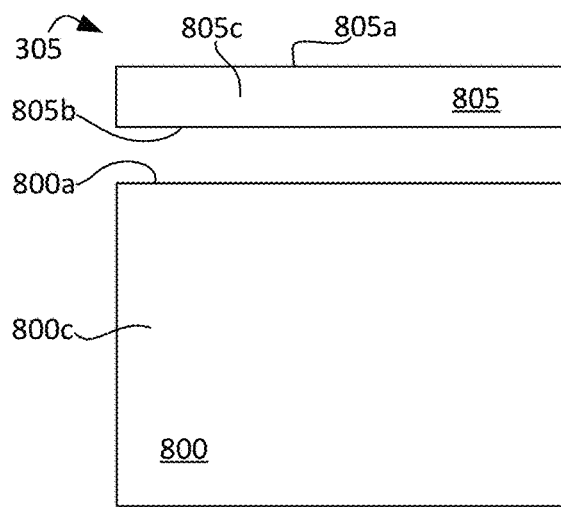
FIG. 21B is a side view of the mold shown in FIG. 21A illustrating its two independent parts.
Figure 21C:
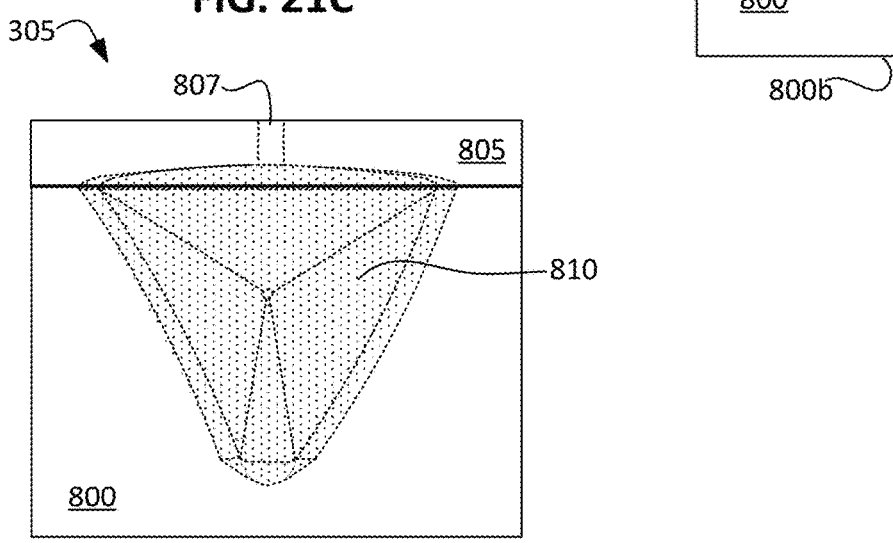
FIG. 21C is a side view of the mold shown in FIG. 21A illustrating the cavity contained within it.
Figure 21D:
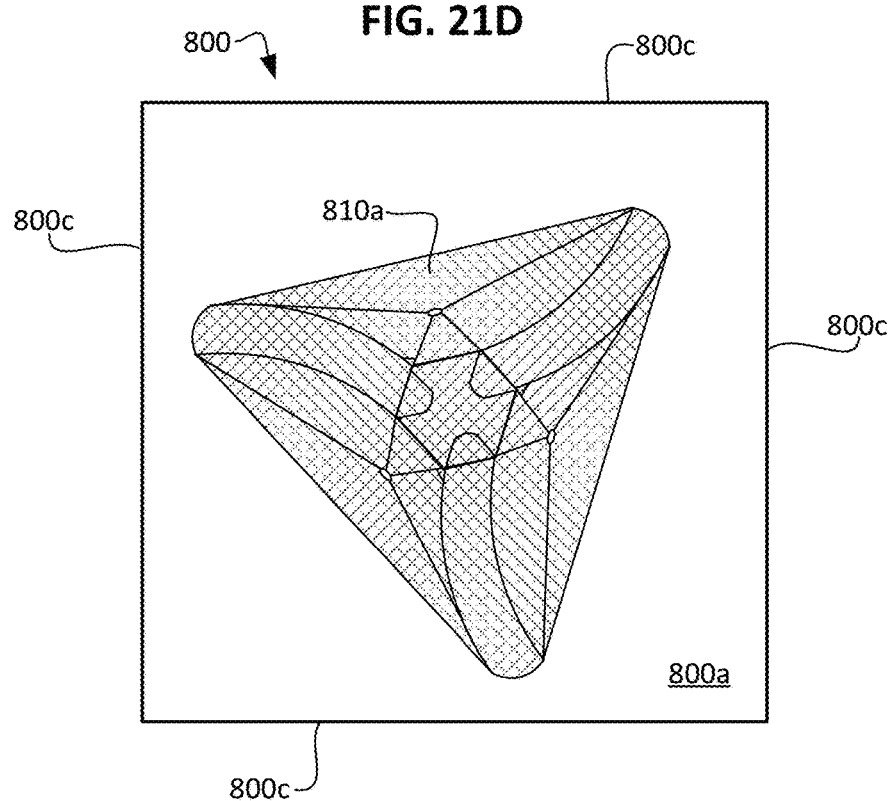
FIG. 21D is a top view of the first mold part and the first cavity of the mold shown in FIG. 21A.
Figure 21E:
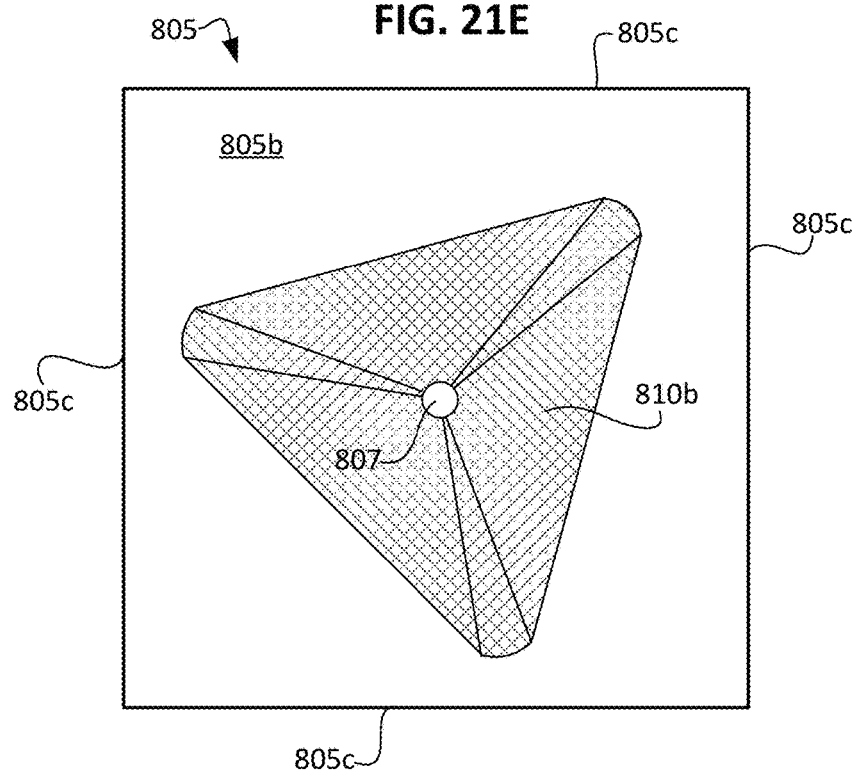
FIG. 21E is a bottom view of the second mold part and the second cavity of the mold shown in FIG. 21A.
Figure 22:
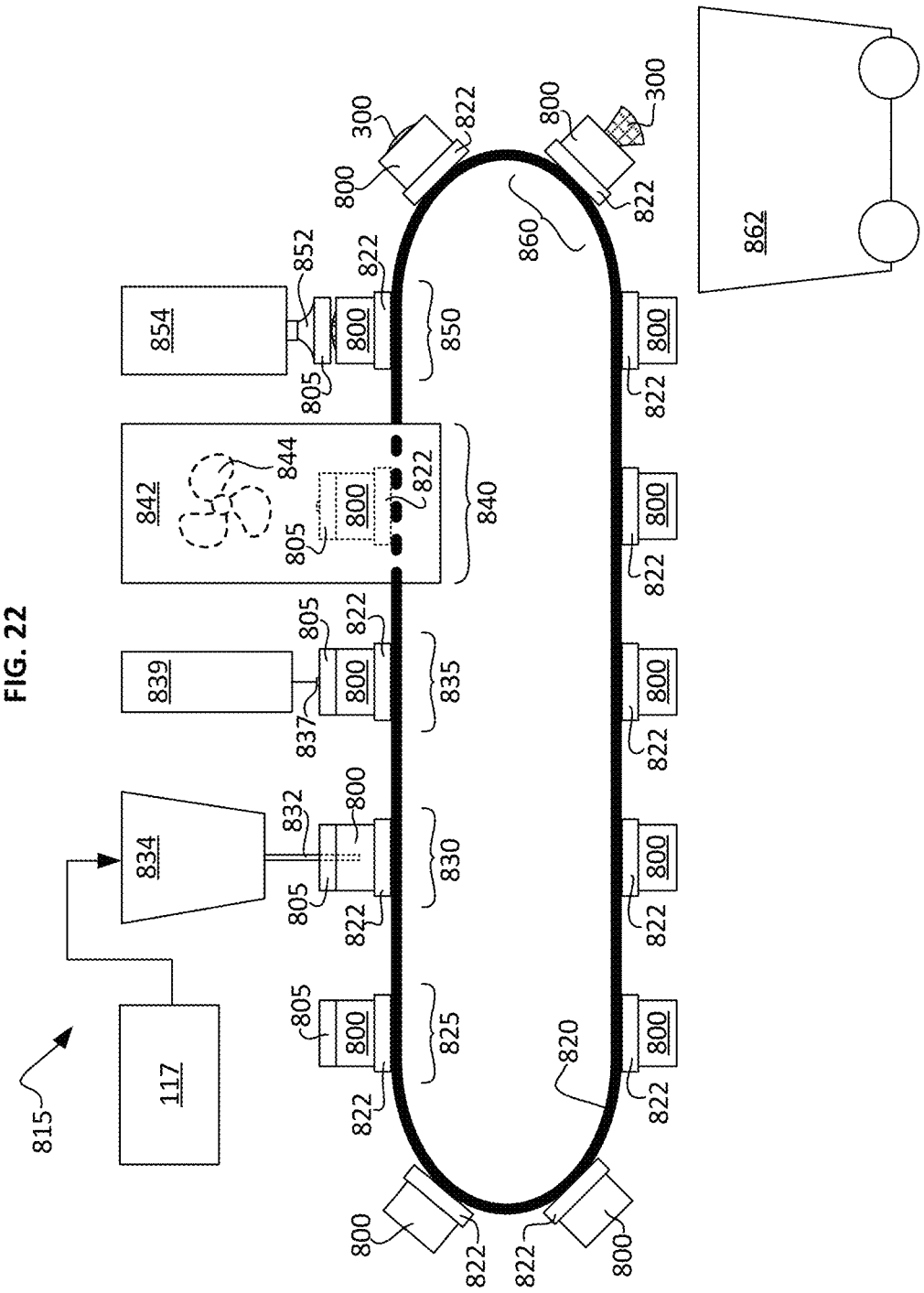
FIG. 22 is an illustration of the process of molding bricks with the example mold shown in FIG. 21A and according to a preferred embodiment of the present invention.

Preferably, for specialized storage container 910 to liquify bricks it receives on its lid 912, receiving lid 912 uses electric or hydronic radiant heat. As shown in the Figures, receiving lid 912 is preferably concave to hold bricks 300 and encourage them to collect at its center, and heating system 914 is a series of cables or other heating element 924 distributed throughout the lid 912. If using cables, they are preferably positioned at regular intervals over the majority of lid 912. Alternative heating elements 924 include coils, mesh, preformed mats, electrically conductive coatings, electrically conductive fillers, or other heating elements embedded in plastic films. The lid's heating system 914 can be self-heating, as with some electrically conductive concrete systems, or it can be operationally connected to a power source 922 and controller 923 to energize and the heating element 924 as shown in FIG. 20C.

Alternatively, other heating systems or hydronic or air radiant heating components can be used for heating system 914. For a hydronic radiant heating system, an open- or closed-loop system of channels 925, which as used herein includes tubing, pipes, and other conduits, can be positioned throughout lid 912 to circulate a heated liquid or fluids such as water, brine, oils, or a mixture of water and propylene glycol. Using a heat source 926 and boiler 927 or water heater, the liquid can be raised to a temperature high enough to heat the lid 912 and thereby melt the bricks 300 collected on lid 912. With a pump 928, the liquid can be pumped into and through the system of channels 925. Propane, natural gas, electricity, or oil can fuel the boiler 927, and additional operational components (not shown) might include valves, an expansion tank, additional pumps, an air separator, air vents, and controllers. Similar to the hydronic heating system, an air radiant heating system circulates fuel-generated heated air or solar heated air through channels within the lid 912.

Delivery system 916 on receiving lid 912 is preferably a plurality of openings sized and configured to allow the melted bituminous material 105 to drain into the cavity 920 of chamber body 918 from the upper surface 912a of lid 912 while preventing solid bituminous material or any of the bricks 300 to pass through. Alternatively, delivery system 916 may be a single central opening, a plurality of channels or grooves, a series of ramps or chutes, or any other structure capable of encouraging viscous material to flow from one location to another. Additionally, any openings, grooves, ramps, or the like may further be coated with a material that further encourages fluid flow.

Optionally, after reheating the bricks 300 to return the bituminous material 105 to its original state, any additives including polymer can be skimmed off at the receiving location 905 by the receiver using methods known to those skilled in the art. To facilitate skimming, one or more skimmers 930 can optionally be connected to or housed within specialized storage chamber 910 or any other receiving or storage chamber for melted bituminous materials. Skimmers suitable for such application will be known to those skilled in the art. Alternatively, melted bituminous material 105 and any additives 106 can be further heated with a second heating system 950 to blending temperatures, and the additive 106 can then be blended into the bituminous material 105. To facilitate blending, a blender 940 can optionally be permanently connected to or housed within specialized storage chamber 910 or any other receiving or storage chamber for melted bituminous material. Blenders suitable for such applications will be known to those skilled in the art. Other additives can be introduced and additional processing of the bituminous material 105 can be accomplished as well depending on the needs of the receiver. In some environments, especially when melted bituminous material 105 will be stored in its viscous state, it may be desirable to further heat the bituminous material 105 while it is being stored. Accordingly, a second heating system 950 can optionally be connected to specialized storage chamber 910 or any other receiving or storage chamber for melted bituminous material, and suitable heating systems will be known to those skilled in the art. Where multiple sub-chambers or modules are present within specialized storage chamber 910, each sub-chamber or module may have a heater, blender, or skimmer. When needed, specialized storage chamber 910 or any other receiving or storage chamber for melted bituminous material can be hooked up to the nearby pipeline so that the melted bituminous material can be pumped out of the storage chamber as is known by those skilled in the art.

Finally, where a refinery or other recipient of bricks 300 melts them and further processes the bituminous material 105, they can optionally recast the melted bituminous material 105 into bricks 300 according to the methods and systems discussed herein.

While there has been illustrated and described what is at present considered to be the preferred embodiment of the present invention, it will be understood by those skilled in the art that various changes and modifications may be made and equivalents may be substituted for elements thereof without departing from the true scope of the invention disclosed, but that the invention will include all embodiments falling within the scope of the claims.

I claim:

1. A solid formation of non-volatile bituminous material configured for bulk transport at temperatures at or below 25° Celsius, the solid formation comprising:
   a) solidified non-volatile bituminous material;
   b) an irregular outer surface defining the solid formation, the irregular outer surface comprising:
      i) a plurality of non-planar face surfaces; and
      ii) a non-planar top surface integrally connected to the plurality of faces non-planar face surfaces; and
   c) a three-dimensional polymer lattice structure disposed throughout the solidified bituminous material wherein the three-dimensional polymer lattice structure extends to each of the non-planar face surfaces and to the non-planar top surface.

2. The solid formation of claim 1 wherein the irregular outer surface further comprises a non-planar bottom surface integrally connected to each of the non-planar face surfaces, and the three-dimensional polymer lattice structure further extends to the non-planar bottom surface.

3. The solid formation of claim 2 wherein the irregular outer surface defines a frustum of a tetrahedron.

4. The solid formation of claim 3 wherein each of the non-planar face surfaces connects to adjacent non-planar face surfaces at angles of less than ninety degrees, to the non-planar top surface at an angle of less than ninety degrees, and to the non-planar bottom surface at an angle of greater than ninety degrees.

5. The solid formation of claim 4 wherein the non-planar top surface comprises a plurality of top surface sections integrally connected to form a convex top surface.

6. The solid formation of claim 4 wherein the non-planar bottom surface comprises a plurality of bottom surface sections integrally connected to form a convex bottom surface.

7. The solid formation of claim 4 wherein each non-planar face surface comprises a plurality of substantially triangular sections integrally connected to form a concave face surface.

8. The solid formation of claim 7 wherein each non-planar face surface further comprises:
   a) a center point;
   b) a first triangular section comprising a planar surface, wherein the first triangular section connects to the center point and the non-planar top surface of the solid formation;
   c) a second triangular section comprising a concave surface, wherein the second triangular section connects to the first triangular section and center point;
   d) a third triangular section comprising a convex surface, wherein the third triangular section connects to the first triangular section and center point; and
   e) a fourth triangular section comprising a planar surface, wherein the fourth triangular section connects to the center point and the non-planar bottom surface of the solid formation.

9. The solid formation of claim 4 wherein the irregular outer surface defining the solid formation further comprises a plurality of curved edges, wherein each curved edge is disposed between and connects two adjacent non-planar face surfaces.

10. The solid formation of claim 4 wherein the irregular outer surface defining the solid formation further comprises a plurality of edge surfaces, wherein each of the edge surfaces is disposed between and connects two adjacent non-planar faces and each of the edge surfaces comprises a plurality of integrally connected planar edge sections.

11. The solid formation of claim 1 wherein the three-dimensional polymer lattice structure comprises between 1% and 10% of the total weight of the solid formation.

12. The solid formation of claim 1 wherein the three-dimensional polymer lattice structure comprises a three-dimensional lattice structure of integrally connected polymer fibers.

13. The solid formation of claim 1 wherein the three-dimensional polymer lattice structure comprises a three-dimensional lattice structure of interwoven polymer fiber groups.

14. The solid formation of claim 1 further comprising buoyant features positioned along the three-dimensional polymer lattice structure.

15. The solid formation of claim 14 wherein the three-dimensional polymer lattice structure comprises a three-dimensional lattice structure of interwoven polymer fiber groups, each buoyant feature comprises a capsule containing air, and each buoyant feature is supported by the three-dimensional lattice structure of interwoven polymer fiber groups.

16. The solid formation of claim 14 wherein the three-dimensional polymer lattice structure defines the plurality of buoyant features, and each buoyant feature comprises a pocket of gas.

17. A solid formation of non-volatile bituminous material configured for bulk transport at temperatures at or below 25° Celsius, the solid formation comprising solidified non-volatile bituminous material and a three-dimensional polymer lattice structure extending throughout the non-volatile bituminous material, wherein the solid formation is defined by an irregular outer surface comprising:
  a) a plurality of non-planar face surfaces, wherein the three-dimensional polymer lattice structure extends to each of the non-planar face surfaces, and each non-planar face surface comprises:
    i) a first face section comprising a planar surface having a perimeter defined by first, second, and third edges;
    ii) a second face section comprising a concave surface having a perimeter defined by first, second, and third edges, wherein the second edge of the second face section integrally connects to the second edge of the first face section;
    iii) a third face section comprising a convex surface having a perimeter defined by first, second, and third edges, wherein the third edge of the third face section integrally connects to the third edge to the first face section;
    iv) a fourth face section comprising a planar surface having a perimeter defined by first, second, and third edges, wherein the third edge of the fourth face section integrally connects to the third edge of the second face section and the second edge of the fourth face section integrally connects to the second edge of the third face section; and
    a center point, wherein the first, second, third, and fourth face sections each integrally connect to the center point;
  b) a top surface integrally connected at angles of less than ninety degrees to the first edges of the first face sections of each of the non-planar face surfaces, wherein the three-dimensional polymer lattice structure further extends to the top surface, and the top surface comprises a plurality of integrally connected top surface sections that form a domed surface;
  c) a bottom surface integrally connected at angles of greater than ninety degrees to the first edges of the fourth face sections of each of the non-planar face surfaces, wherein the three-dimensional polymer lattice structure extends to the bottom surface, and the bottom surface comprises a plurality of integrally connected bottom surface sections that form a domed surface; and
  d) a plurality of curved edges, wherein each curved edge integrally connects at a top end to the top surface and at a bottom end to the bottom surface and is disposed between and integrally connects the first edges of the second face sections of each of the non-planar face surfaces to the first edges of the third face sections of an adjacent non-planar face surface.

18. The solid formation of claim 17 wherein the three-dimensional polymer lattice structure comprises a three-dimensional lattice structure of integrally connected polymer fibers.

19. The solid formation of claim 18 wherein the three-dimensional polymer lattice structure comprises a three-dimensional lattice structure of interwoven polymer fiber groups supporting a plurality of air capsules positioned among the three-dimensional lattice structure of interwoven polymer fiber groups at regular intervals.

20. The solid formation of claim 18 wherein the three-dimensional lattice structure of integrally connected polymer fibers defines a plurality of pockets of gas positioned at regular intervals throughout the three-dimensional lattice structure of integrally connected polymer fibers.

21. The solid formation of claim 17 wherein the three-dimensional polymer lattice structure comprises between 1% and 10% of the total weight of the solid formation.

22. A plurality of solid formations of non-volatile bituminous material configured for bulk transport in a container and at a temperature of 25° Celsius or below,
  wherein
    each of the plurality of solid formations comprises solidified non-volatile bituminous material and a three-dimensional polymer lattice structure,
    each of the solid formations is defined by an irregular outer surface configured to limit surface contact to less than 5% with adjacent solid formations during bulk transport in a container, the irregular outer surface comprising a non-planar top surface and three non-planar face surfaces, wherein each non-planar face surface connects to adjacent non-planar face surfaces and to the non-planar top surface at acute angles, and
    the three-dimensional polymer lattice structure is disposed throughout the solidified non-volatile bituminous material, extending to the non-planar face surfaces and the non-planar top surface.

23. The plurality of solid formations of claim 22 wherein the irregular outer surface defining each of the plurality of solid formations further comprises a non-planar bottom surface connected to each of the non-planar face surfaces at obtuse angles, wherein the three-dimensional polymer lattice structure further extends to the non-planar bottom surface.

24. The plurality of solid formations of claim 22 wherein each of the solid formations further comprises a plurality of buoyant features positioned along the three-dimensional polymer lattice structure.

25. The plurality of solid formations of claim 22 wherein the three-dimensional polymer lattice structure of each of the solid formations comprises a three-dimensional lattice structure of integrally connected polymer fibers.

26. The plurality of solid formations of claim 25 wherein the three-dimensional lattice structure of integrally connected polymer fibers defines a plurality of pockets of gas.

27. The plurality of solid formations of claim 22 wherein the three-dimensional polymer lattice structure of each of the solid formations comprises a three-dimensional lattice structure of interwoven polymer fiber groups.

28. The plurality of solid formations of claim 27 further comprising a plurality of capsules containing air wherein each capsule containing air is supported by the three-dimensional lattice structure of interwoven polymer fiber groups.

29. The plurality of solid formations of claim 22 wherein, for each of the solid formations, the three-dimensional polymer lattice structure comprises between 1% and 10% of the total weight of the solid formation.

* * * * *